(12) United States Patent
Savage et al.

(10) Patent No.: US 12,547,971 B2
(45) Date of Patent: *Feb. 10, 2026

(54) DISPENSING AND TRACKING SYSTEM

(71) Applicants: Benjamin V. Savage, Lebanon, OH (US); Edward A. Fullman, Cincinnati, OH (US); Saurabh Sarkar, Mason, OH (US); Christopher M. Hodapp, Cincinnati, OH (US); Richard Mathias Alden, Loveland, OH (US)

(72) Inventors: Benjamin V. Savage, Lebanon, OH (US); Edward A. Fullman, Cincinnati, OH (US); Saurabh Sarkar, Mason, OH (US); Christopher M. Hodapp, Cincinnati, OH (US); Richard Mathias Alden, Loveland, OH (US)

(73) Assignee: APEX INDUSTRIAL TECHNOLOGIES LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,600

(22) Filed: Sep. 19, 2024

(65) Prior Publication Data

US 2025/0013979 A1   Jan. 9, 2025

Related U.S. Application Data

(63) Continuation of application No. 16/739,852, filed on Jan. 10, 2020, now Pat. No. 12,112,293.

(Continued)

(51) Int. Cl.
G06Q 10/0836 (2023.01)
G06Q 10/0832 (2023.01)
G06Q 10/087 (2023.01)

(52) U.S. Cl.
CPC ..... *G06Q 10/0836* (2013.01); *G06Q 10/0832* (2013.01); *G06Q 10/087* (2013.01)

(58) Field of Classification Search
USPC ........................................................ 705/339
See application file for complete search history.

(56) References Cited

U.S. PATENT DOCUMENTS 5,711,160 A    1/1998  Namisniak
8,423,431 B1   4/2013  Rouaix
(Continued)

FOREIGN PATENT DOCUMENTS

CA    3040843 A1    6/2018
CN    115180331 A   10/2022
(Continued)

OTHER PUBLICATIONS

"HelloPackage's Intelligent Shelving Unit Is the Package Storage Your Apartment Comlex Needs," by Muriel Vega, Sep. 17, 2018 (Year: 2018).*

(Continued)

*Primary Examiner* — Michael P Harrington
*Assistant Examiner* — Brian Adams Heflin
(74) *Attorney, Agent, or Firm* — Thompson Hine LLP

(57) ABSTRACT

A dispensing system including a dispensing component configured to receive a plurality of items thereon or therein, where the plurality of items are part of a single order. The system further includes a sensor configured to identify a location of each of the plurality of items on or in the component, and a controller operatively coupled to the sensor. The controller is configured to automatically track, after initial placement of the plurality of items on or in the component, the location each of the plurality of items that are repositioned on or in the component. The controller is also configured to associate each of the plurality of items (Continued)

with the order, both before and after repositioning. The system includes a display device operatively coupled to the controller, wherein the display device is configured to dynamically display information that conveys that the plurality of items are part of the single order.

29 Claims, 16 Drawing Sheets

Related U.S. Application Data

(60) Provisional application No. 62/791,250, filed on Jan. 11, 2019.

(56) References Cited

U.S. PATENT DOCUMENTS

| | | | |
|---|---|---|---|
| 9,171,278 | B1 | 10/2015 | Kong |
| 9,322,207 | B2 | 4/2016 | Savage |
| 9,489,655 | B1* | 11/2016 | Lecky ............... G06Q 10/0875 |
| 9,694,488 | B2 | 7/2017 | Savage |
| 10,040,628 | B1 | 8/2018 | Misra |
| 10,216,157 | B2 | 2/2019 | Savage |
| 10,435,937 | B2 | 10/2019 | Savage |
| 10,586,208 | B2* | 3/2020 | Buibas ..................... G06T 7/74 |
| 2002/0162836 | A1 | 11/2002 | Taino |
| 2009/0224040 | A1 | 9/2009 | Kushida |
| 2009/0236420 | A1* | 9/2009 | Londo .................... G06K 17/00 |
| | | | 235/385 |
| 2011/0252813 | A1 | 10/2011 | Veltrop |
| 2012/0203376 | A1 | 8/2012 | Savage |
| 2015/0019391 | A1 | 1/2015 | Kumar |
| 2015/0356664 | A1 | 12/2015 | Mackler |
| 2016/0134930 | A1 | 5/2016 | Swafford |
| 2016/0300187 | A1 | 10/2016 | Kashi |
| 2017/0169799 | A1 | 6/2017 | Kim |
| 2017/0193439 | A1* | 7/2017 | Jones ................... G06K 7/1413 |
| 2017/0228686 | A1* | 8/2017 | Bermudez Rodriguez .................. |
| | | | G06Q 10/06315 |
| 2017/0308919 | A1 | 10/2017 | Karuvath |
| 2017/0344935 | A1 | 11/2017 | Mattingly |
| 2018/0122022 | A1 | 5/2018 | Kelly |
| 2018/0122063 | A1 | 5/2018 | Dehais |
| 2018/0137462 | A1 | 5/2018 | Zohar |
| 2018/0165711 | A1* | 6/2018 | Montemayor ..... G06Q 30/0255 |
| 2018/0349973 | A1 | 12/2018 | Bonner |
| 2018/0365642 | A1 | 12/2018 | Bonner |
| 2019/0156277 | A1 | 5/2019 | Fisher |
| 2019/0213212 | A1 | 7/2019 | Adato |
| 2019/0304238 | A1* | 10/2019 | Ambauen ........ G06Q 20/40145 |
| 2020/0167850 | A1* | 5/2020 | Sullivan ............... G06K 7/1413 |
| 2022/0223019 | A1* | 7/2022 | Shakedd ............ G08B 13/2462 |

FOREIGN PATENT DOCUMENTS

| | | |
|---|---|---|
| WO | 2018213689 A1 | 11/2018 |
| WO | 2019140091 A1 | 7/2019 |

OTHER PUBLICATIONS

"HelloPackage's Intelligent Shelving Unit Is the Package Storage Your Apartment Complex Needs," by Muriel Vega, Sep. 17, 2018 (Year: 2018).*

"Eatsa launches smart pickup shelves," by Emma Liem Beckett, Jan. 14, 2019 (Year: 2019).*

Canadian Intellectual Property Office, Office Action, Canadian Patent Application No. 3125643, 5 pages, Jan. 29, 2025.

IP Australia, Examination Report No. 1 issued Oct. 25, 2024, which pertains to Australian Patent Application No. 2020206260. 3 pages.

PCT, International Search Report and Written Opinion, International Application No. PCT/US2020/013090, 14 pages, Apr. 1, 2020.

Webpage featuring "eatsa Introduces Innovative Solution to Simplify Order Pickup Process", by GlobeNewswire, 4 pages, https://www.globenewswire.com/news-release/2019/01/09/1682855/0/en/eatsa-Introduces-Innovative-Solution-to-Simplify-Order-Pickup-Process.html , Jan. 9, 2019.

European Patent Office, Extended European Search Report, European Patent Application No. 20739114.5, 8 pages, Sep. 6, 2022.

"Eatsa launches smart pickup shelves," by Emma Liem Beckett, Jan. 14, 2019.

U.S. Patent and Trademark Office, Non-Final Office Action, U.S. Appl. No. 16/739,852, 38 pages, May 12, 2021.

U.S. Patent and Trademark Office, Final Rejection, U.S. Appl. No. 16/739,852, 56 pages, Oct. 22, 2021.

U.S. Patent and Trademark Office, Advisory Action, U.S. Appl. No. 16/739,852, 3 pages, Feb. 14, 2022.

U.S. Patent and Trademark Office, Non-Final Office Action, U.S. Appl. No. 16/739,852, 68 pages, Jun. 28, 2022.

U.S. Patent and Trademark Office, Final Rejection, U.S. Appl. No. 16/739,852, 83 pages, Feb. 14, 2023.

U.S. Patent and Trademark Office, Notice of Panel Decision from Pre-Appeal Brief Review, U.S. Appl. No. 16/739,852, 2 pages, Jun. 2, 2023.

U.S. Patent and Trademark Office, Non-Final Office Action, U.S. Appl. No. 16/739,852, 64 pages, Jul. 6, 2023.

U.S. Patent and Trademark Office, Final Rejection, U.S. Appl. No. 16/739,852, 47 pages, Feb. 27, 2024.

U.S. Patent and Trademark Office, Advisory Action, U.S. Appl. No. 16/739,852, 3 pages, May 9, 2024.

U.S. Patent and Trademark Office, Notice of Allowance, U.S. Appl. No. 16/739,852, 13 pages, Jun. 13, 2024.

European Patent Office, Examination Report (Communication pursuant to Article 94(3) EPC), European Patent Application No. 20739114.5, 7 pges, Mar. 31, 2025.

IP Australia, Examination Report No. 2 for Standard Patent Application, Australian Patent Application No. 2020206260, 3 pages, Apr. 16, 2025.

IP Australia Examination Report No. 3 for Standard Patent Application , Australian Patent Application No. 2020206260, 5 pages, Sep. 23, 2025.

IP Australia, Notice of Acceptance for Patent Application , Australian Patent Application No. 2020206260, 3 pages, Nov. 3, 2025.

Canadian Intellectual Property Office, Examination Report, Canadian Patent Application No. 3,125,643, 6 pages, Oct. 21, 2025.

\* cited by examiner

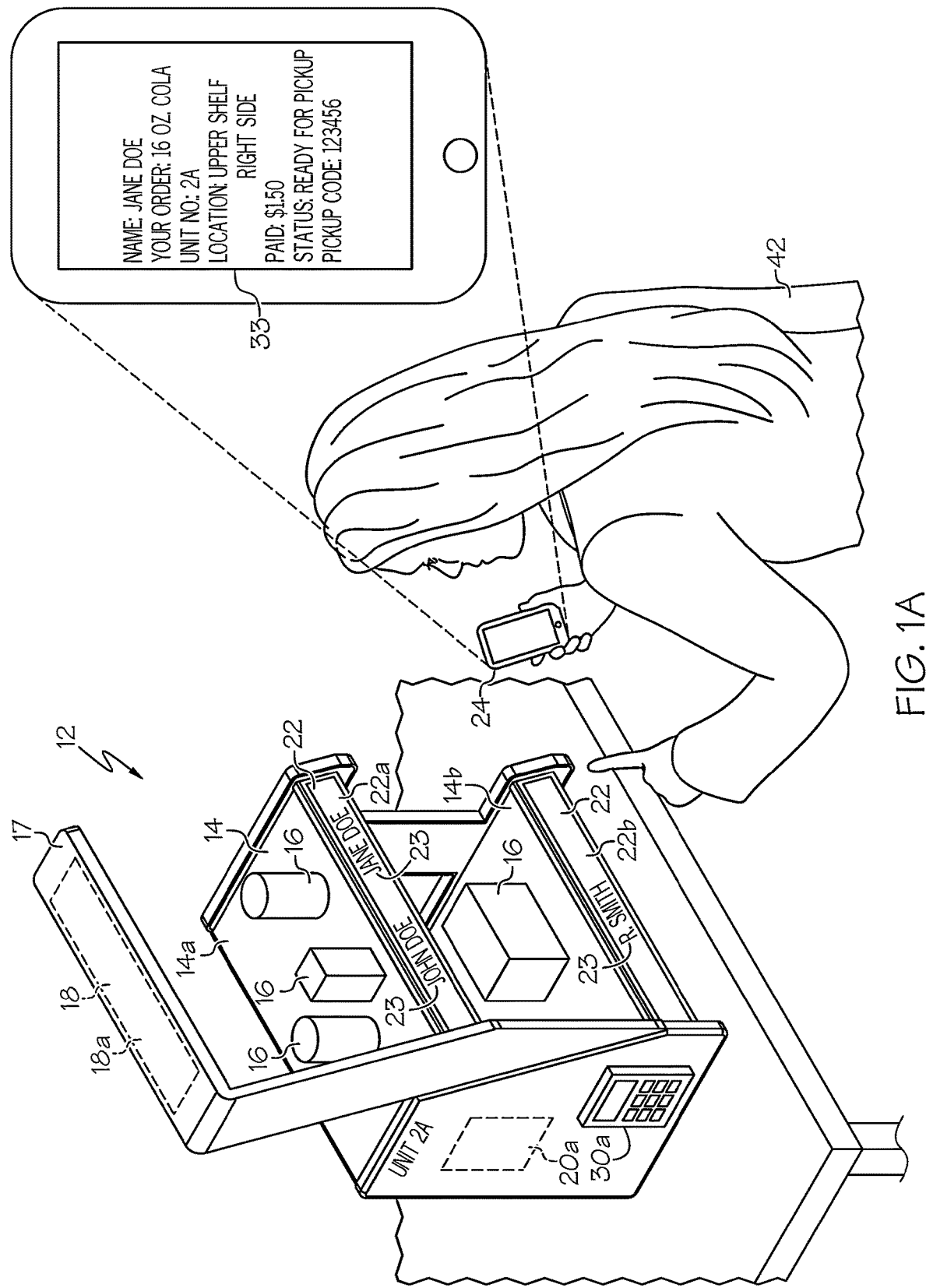

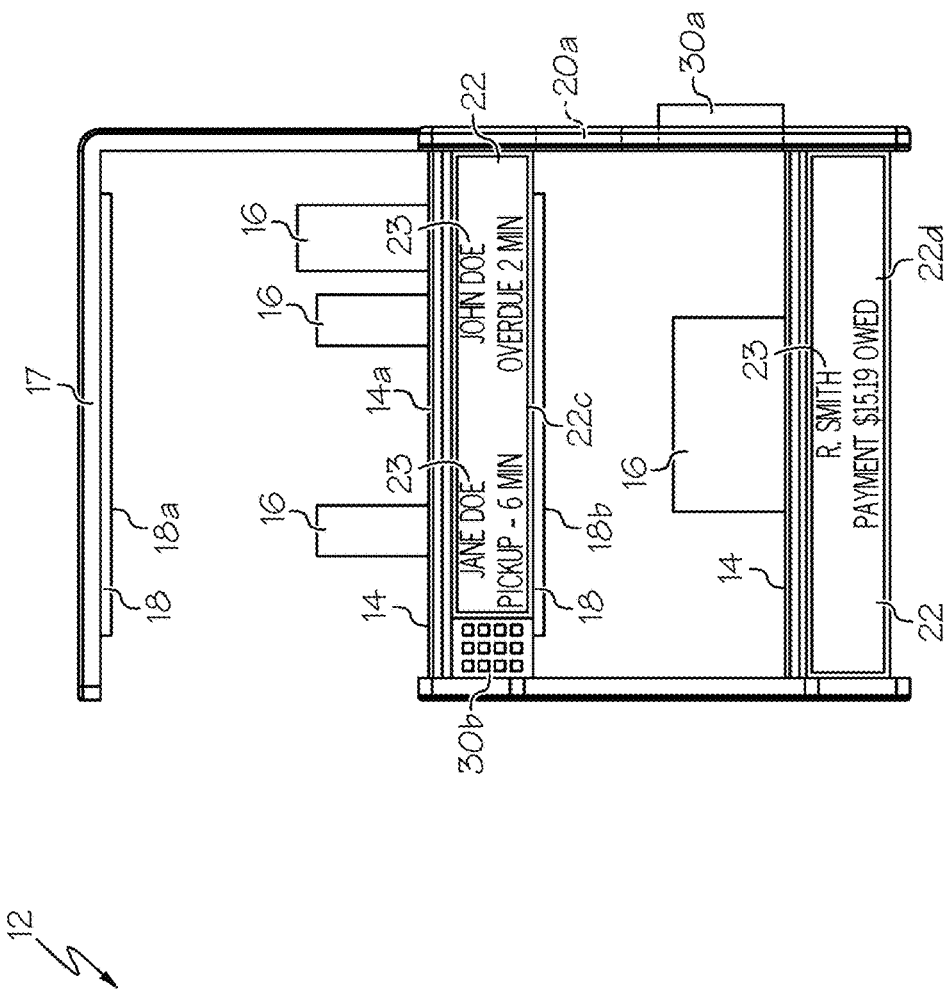
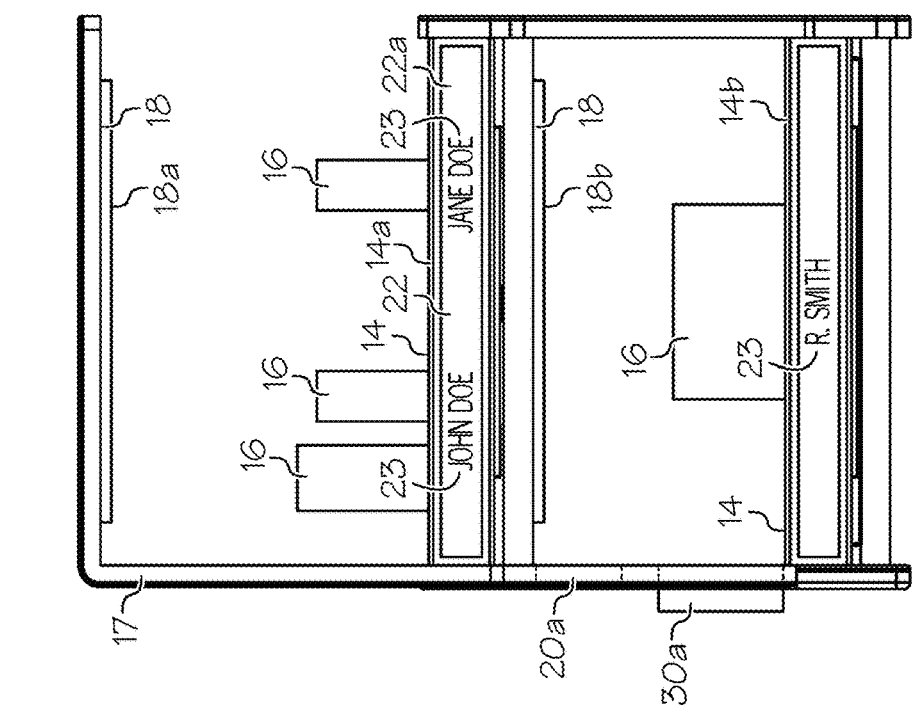
FIG. 1C
FIG. 1B

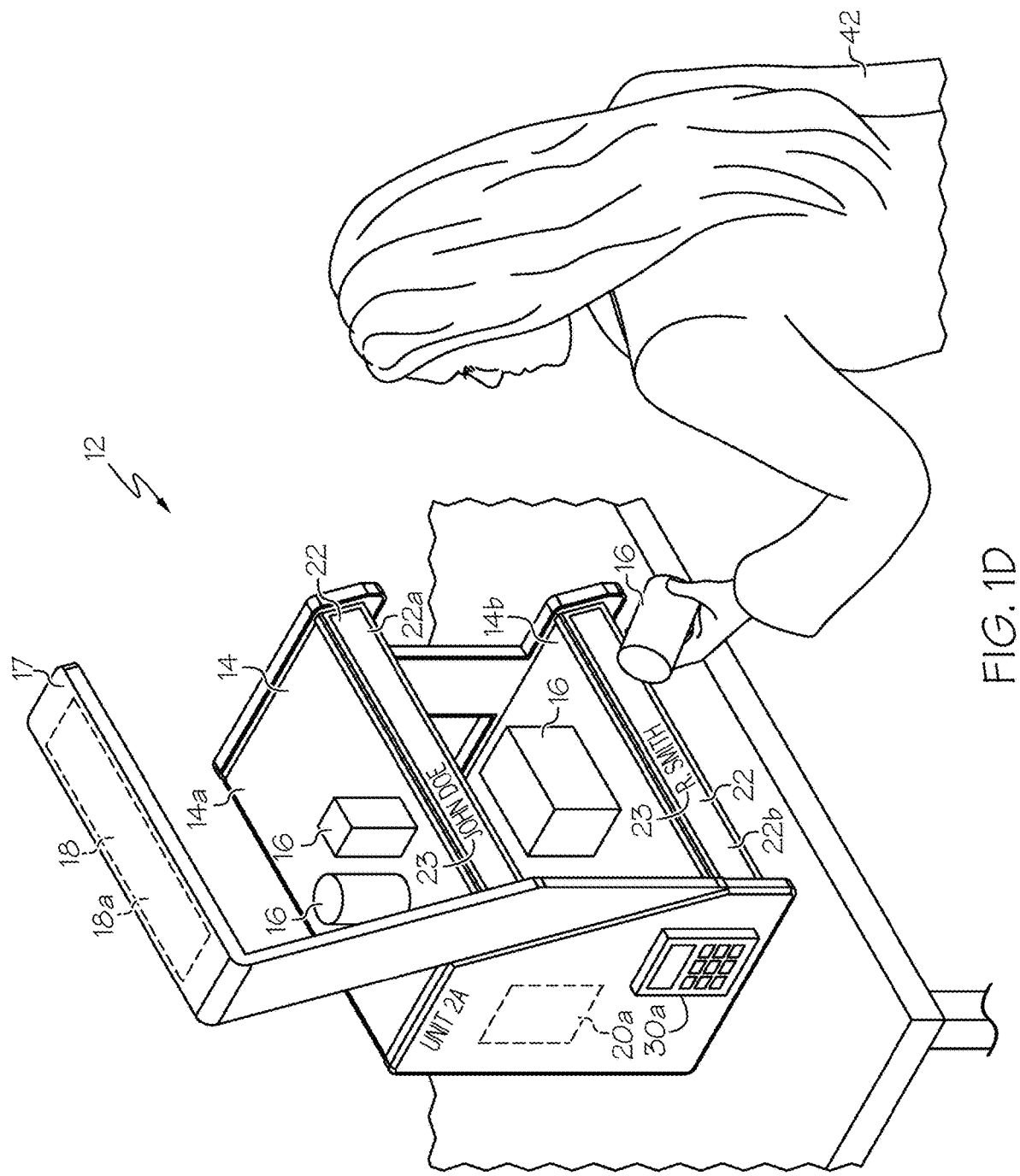

DISPENSING AND TRACKING SYSTEM

This application is a continuation of U.S. patent application Ser. No. 16/739,852 filed on Jan. 10, 2020, which in turn claims priority to U.S. Provisional Patent Application Ser. No. 62/791,250, filed on Jan. 11, 2019, and entitled Dispensing And Tracking System. The entire contents of both these applications are hereby incorporated by reference.

This application is directed to a system for dispensing and tracking of various items.

BACKGROUND

Companies and other entities often have a need to dispense and track items in a variety of settings. Such dispensing companies and entities can include, for example, retail operations, grocery stores, restaurant/food service companies and other companies with sales and/or delivery operations, along with inventory and asset management companies such as warehouse operators, factory floor operators, medical facilities, IT facilities, or others businesses which track physical assets. Such dispensing entities may receive requests or orders for items from customers or recipients. Such orders or requests can be placed remotely by any of a variety of methods, such as call-ahead, internet/website ordering, mobile device ordering through interacting with apps, etc. After receiving and processing such requests, dispensing entities may offer self-service, pick-up options for the transfer of possession of items to the customer. If payment is required, the dispensing entity can accommodate pre-payment such that the recipient can provide proof-of-purchase at the pickup location and then be presented with, and take possession of, the purchased/transferred item(s). Pre-payment enables the recipient to avoid interacting with store personnel, and reduces friction points that can slow the dispensing process.

However, efficiently fulfilling remotely-initiated orders for pickup by the recipient can create logistical challenges. In some settings, upon arrival at the pickup location, a remote-order recipient must wait in the same line with other customers, despite the fact that his/her order is already paid for and/or prepared and ready for pick-up. In addition, when a remote-order recipient reaches the point-of-sale or dispensing location, the cashier/operator of the dispensing entity may be required to confirm payment and/or the identity of the recipient, and then step away from their workstation to retrieve the order and deliver it to the recipient. These challenges can increase the wait time for other customers or recipients. In some cases dispensing entities may increase staffing to provide dedicated personnel to speed the fulfillment of such orders, but such dedicated personnel can impose an additional burden on resources of the dispensing entity.

SUMMARY

In one embodiment, the invention is a dispensing system including a sensor configured to identify a position of an item on a surface of a component, a controller operatively coupled to the sensor, and a display device operatively coupled to the controller. The display device is configured to dynamically display information relating to the item. The display device is configured to display the information at a location physically associated with the item.

BRIEF DESCRIPTION OF THE DRAWINGS

FIG. 1A is a front perspective view of one embodiment of a dispensing component that may comprise or be used as part of the dispensing system as disclosed herein, shown in conjunction with a user and a mobile device;

FIG. 1B is a front view of the dispensing component of FIG. 1A;

FIG. 1C is a back view of the dispensing component of FIG. 1A;

FIG. 1D is a front perspective view of the system of FIG. 1A, with an item removed therefrom by the user;

DETAILED DESCRIPTION

The system and method described herein can be used to enable or facilitate the transfer or dispensing of any of a variety of products, items or the like. The system can be utilized in conjunction with nearly any type of product, item or the like so long as such product, item or the like can be physically accommodated in the system, including but not limited to, food, beverages, groceries, pharmaceuticals, retail merchandise, parts, components, work pieces, hardware, electronic equipment the like, and are collectively termed "items" herein. In one case the item is transferred from or between two users, parties or entities, termed herein a "dispensing" user, party or entity on the one hand, and a "retrieving" user party or entity on the other hand (also sometimes termed a "recipient").

The dispensing party can be for example, a party or entity that owns, controls and/or operates retail operations, grocery stores, restaurant/food service companies and other sales, leasing and/or delivery operations. The dispensing party can also or instead be an inventory and asset management company such as a warehouse operator, factory floor operator, medical or health care facility, IT facility, or other entities or operations which track assets. The recipient can in one case be an individual such as a purchaser or customer, or can instead be an entity that is represented by or acting through an individual (such as an agent) or individuals who can physically acquire an item on behalf of the entity, such as an employee who picks up an items on behalf of his/her employer. In these or other cases it is possible that title/ownership of the item is, has been or will be transferred from the dispensing party to the retrieving party, such as in a sale transaction. In certain other cases, the recipient can be a worker, employee or agent of the dispensing entity, such as where the transferred items are useful to the recipient in carrying out his/her job duties. In this case title/ownership of the dispensed items is not necessarily transferred through use of the disclosed system or method. For example the dispensed items can in one case be inventoried items that are transferred to employees of the dispensing entity for use or consumption on or behalf of the dispensing entity. The system and method may also be used in various other settings, such as in a lending or leasing arrangement and/or to return a product to the dispensing party in a return transaction, etc.

Figure 1E:
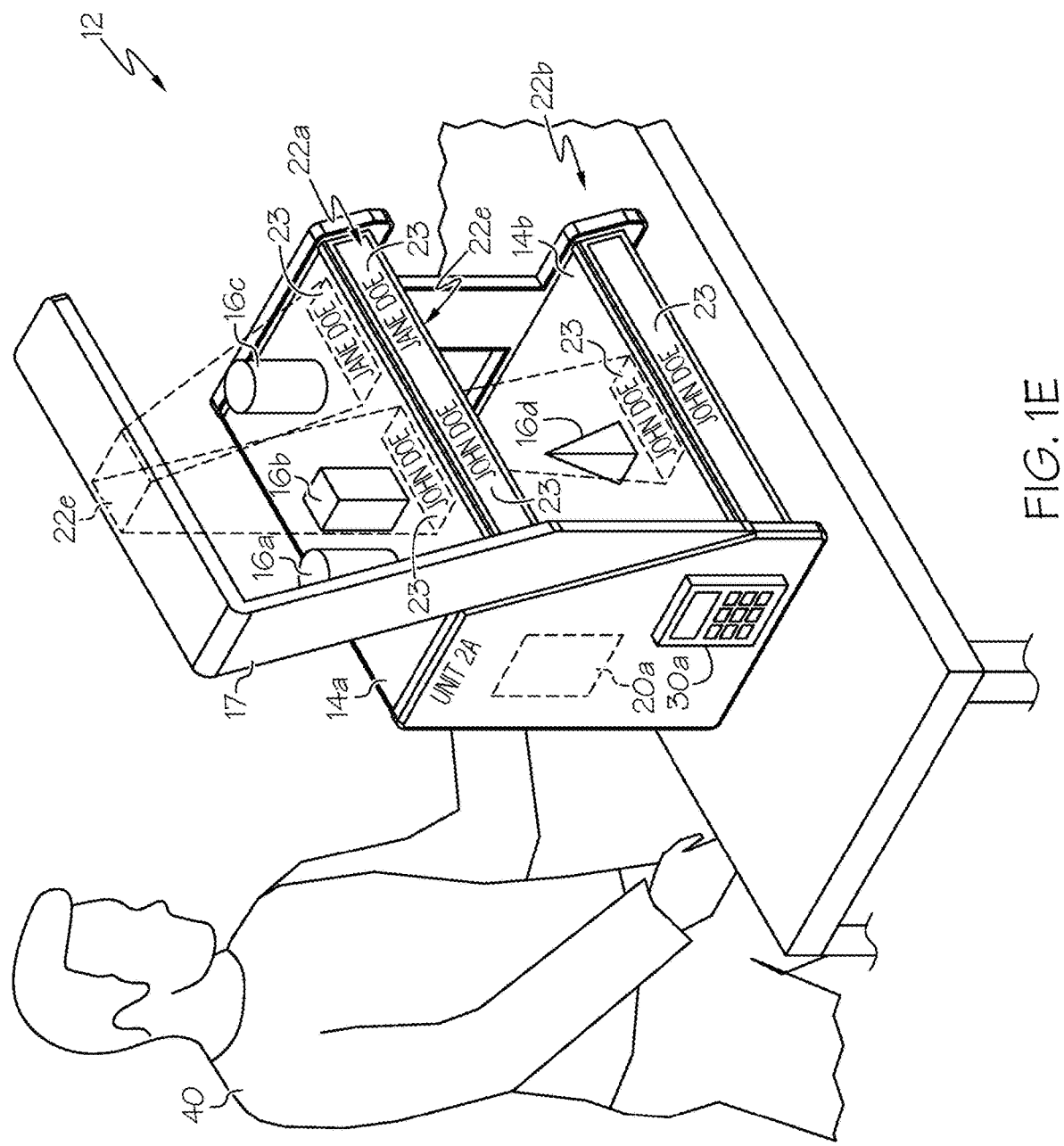
FIG. 1E is a front perspective view of the system of FIG. 1A, with a different configuration of items, and with an additional display.
Figure 2A:
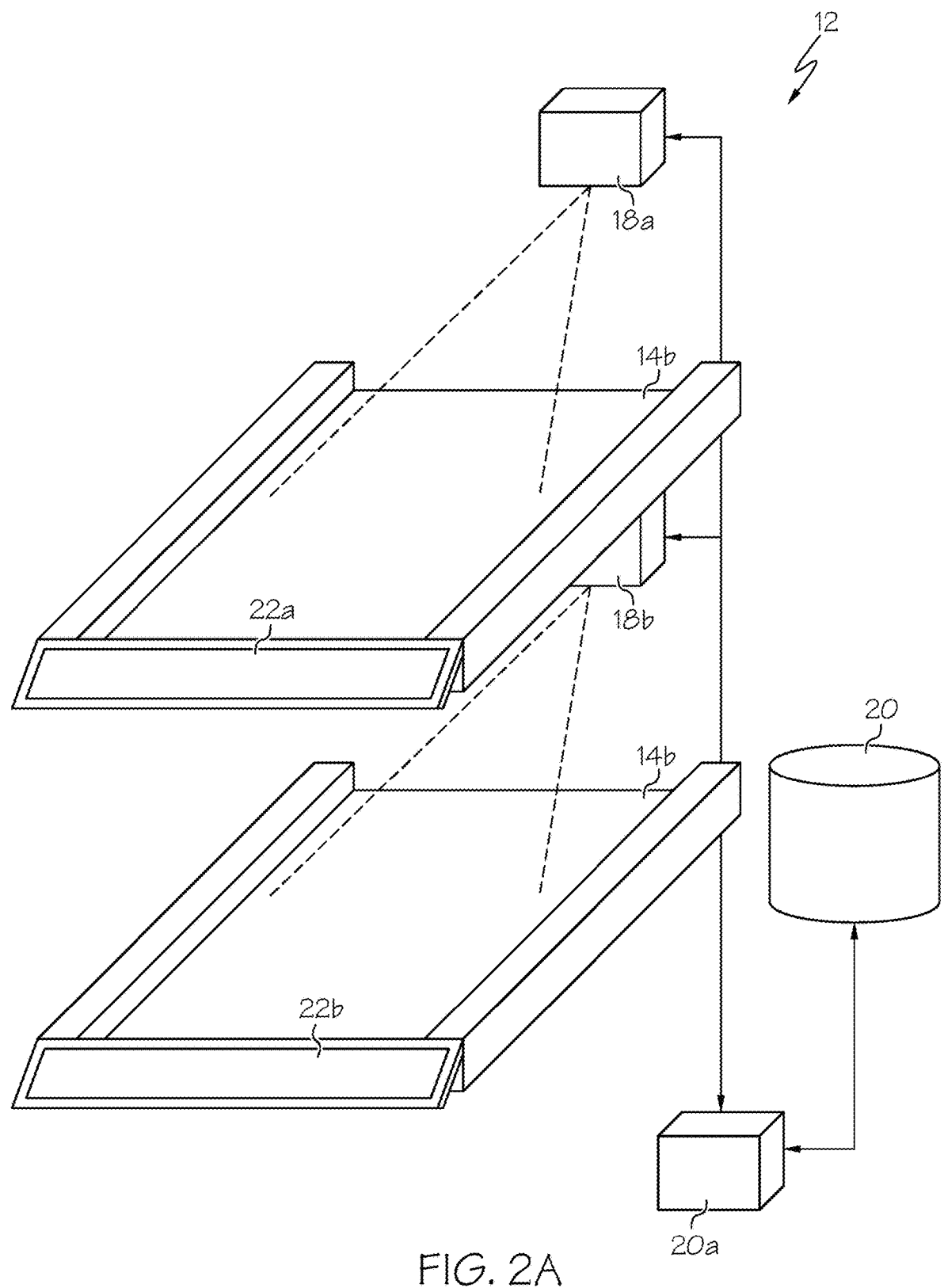
FIG. 2A is a schematic representation of the dispensing component of FIGS. 1A-1E.
Figure 2B:
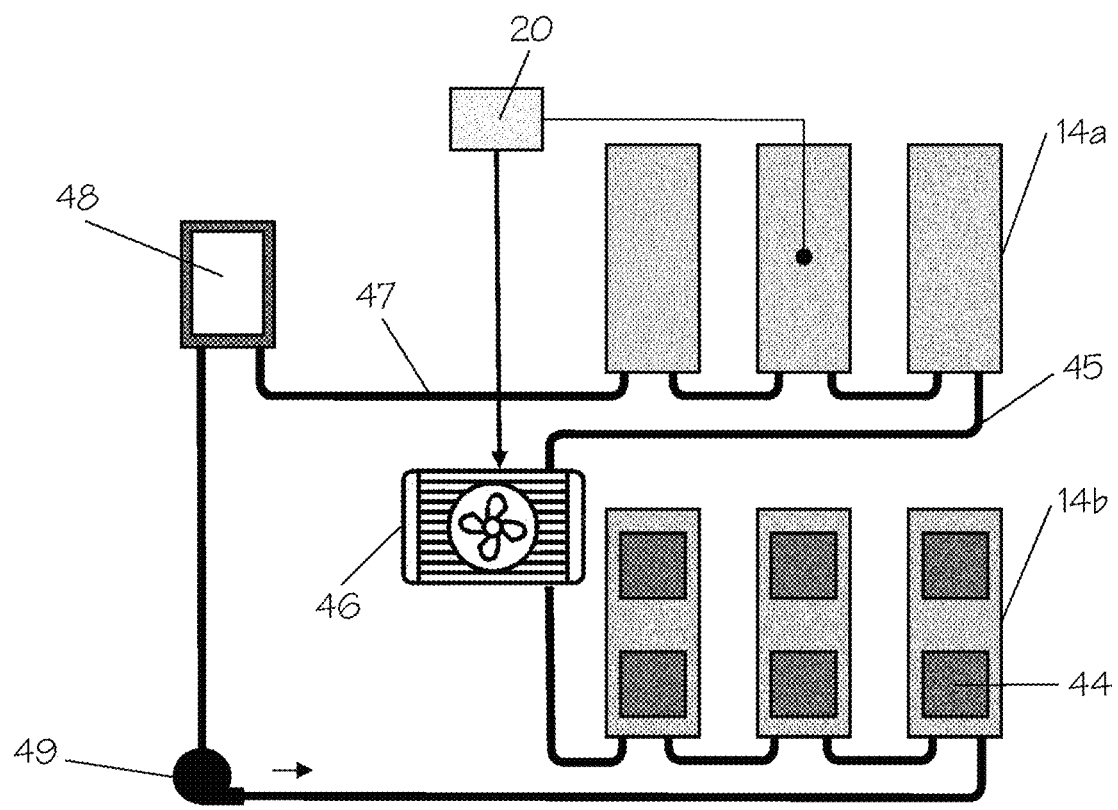
FIG. 2B is a schematic representation of an exemplary heating and cooling system for the dispensing component of FIGS. 1A-1E.
Figure 3:
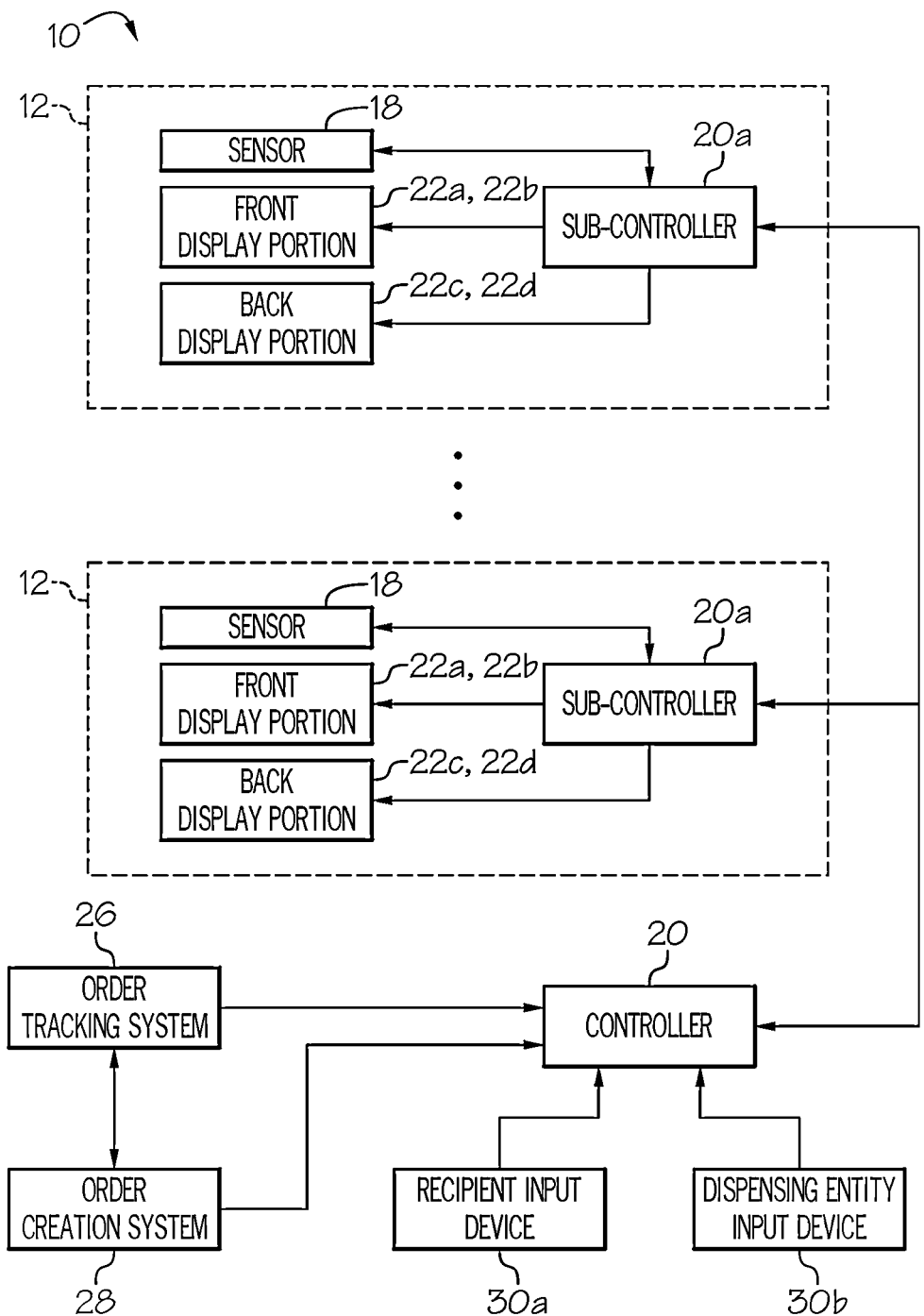
FIG. 3 is a further schematic representation of the dispensing component of FIGS. 1A-1E.

With reference to FIGS. 1-3, in one embodiment the dispenser or dispensing system 10 includes a component, dispenser or dispensing component 12 defining a surface or dispensing surface 14 which can physically support the item or items 16 to be dispensed and/or tracked. In one embodiment, the dispensing component 12 includes or take the form of a shelf or shelf system with multiple dispensing surfaces 14a, 14b, where the dispensing surfaces 14a, 14b are vertically spaced apart in the particular illustrated embodiment, but could also be horizontally spaced or in other configurations. While two dispensing surfaces 14a, 14b are shown, the system 10/dispensing component 12 can include more or less numbers of dispensing surfaces 14. In one case, the dispensing surfaces 14a, 14b may be generally flat, planar and parallel, and lack any cut-outs, depressions, printed indicia or other features that predetermine where the items 16 may or must be located such that the items 16 can be positioned on the dispensing surfaces 14 at any of a variety of locations. In other cases the dispensing surfaces 14a, 14b can include any combination of cut-outs, depressions, printed indicia or other features to receive and/or stabilize the items 16 or guide in the positioning or dispensing of items 16 thereon.

The multiple dispensing surfaces 14a, 14b can be spaced apart, discontinuous and/or not directly physically contiguous, such as multiples shelves on a shelving unit, and can have the outward appearance of a standard shelving unit or the like. However the dispensing component 12 can take any of a variety of other forms beyond that shown or described herein such as a table, table top, counter top, rack, drawer, desk, tray, cart, cabinet, or the like, or larger spaces like a storage room, or simply an area of floor space. The dispensing component 12 may be fixed in place or may be movable, such as a wheeled tray or the like such that the dispensing component 12 can be transported from one location to another. The dispensing component 12 can be formed from multiple modular sub-components which can releasably attached together, and/or to a variety of other items (such as a racks, a storage space or a roof of room) to form the dispensing component 12.

If desired the dispensing component 12 can include generally enclosed cavities (such as those in a locker system) with sidewalls and doors, drawers or the like (not shown) that must be opened, moved or otherwise actuated in order to access the dispensing surface 14. As will be described in greater detail below, in some cases a recipient must be authenticated before being able to access the dispensing surface 14 (e.g. be required to be authenticated before opening the door, drawer, or the like), and/or be authenticated prior to placing an/or removing an item 16 from the dispensing surface 14, while in other cases no authentication is required for access, placement and/or removal of items 16.

The system 10 can further include a sensor or sensor system 18 which includes or is in one case made up of sensor portions 18a, 18b. In the embodiment of FIG. 1 each sensor portions 18a, 18b is positioned above the associated dispensing surface(s) 14a, 14b, but the sensor 18 or sensor portions 18a, 18b, can be positioned below and/or integrated into the surfaces 14, be located to the side of the surfaces 14, etc. In one case the first sensor portion 18a is positioned on the underside of an arm 17 positioned above the top dispensing surface 14a, and the second sensor portion 18b can in one case be positioned on the underside of the top dispensing surface 14a as shown in FIGS. 1B and 1C. The sensor 18 can include as many sensor portions 18a, 18b, as necessary or desired.

The sensor 18 is operatively coupled to a controller 20 and/or a controller or sub-controller 20a that can receive and process the output of the sensor 18. The sensor 18 and/or controller 20 can be configured to identify items 16 positioned on the dispensing surface 14, identify their positions and track the movement of such items 16, such as identifying and tracking items 16 on the dispensing surface 14, removal of the items 16 from the surface 14, movement of items 16 from one portion/position of the surface 14 to another portion/position, presence/absence of the items 16 on the surface 14, etc. In one case each sub-controller 20a, 20b is coupled to or associated with a single dispensing component 12, and the system 10 can include as many sub-controllers 20a, 20b as necessary or desired.

The sensor or sensor system 18 can take any of a wide variety of form of sensors, including optical sensors such as cameras (including depth camera and time-of-flight cameras), charge coupled device ("CCD") sensors, LIDAR, etc. that in one case have an unobstructed line of sight to the items 16 being sensed. The sensor or sensor system 18 can also include other sensing devices such as pressure or force sensors, weight sensors, detectors based on mechanical forces, membrane switches/sensors, magnetic switches/sensors, light or electromagnetic radiation (visible, infrared or otherwise) sensors, contact sensors, photoelectric sensors, ultrasonic sensors, piezoelectric sensors, piezoresistive sensors, accelerometers, motion sensors, tilt sensors, proximity sensors, electric field sensors and the like.

The system 10 also includes a display or display device 22 which includes or is made up of, in one case, display portions 22a, 22b, 22c, 22d, 22e operatively coupled to the controller 20/sensor 18. As best shown in FIG. 2A, the display device 22 may include front display portions 22a, 22b, such as display ribbons, that are facing and/or configured to display information to a person (such as a recipient or receiving person or entity 42) positioned on the front side of the dispensing component 12. The display device 22 can also include rear display portions 22c, 22d (FIG. 1C), such as display ribbons, that are facing and/or configured to display information to a person (such as a dispensing person or entity 40) positioned on the rear side of the dispensing component 12. In the illustrated embodiment the front 22a, 22b and rear 22c, 22d display portions are located at, adjacent to, or form the front or rear edge of the associated shelf or dispensing surface 14a, 14b. Moreover, in the illustrated embodiment the display portions 22a, 22b, 22c, 22d can take the form of a dynamic display screen such as a LED display, plasma display, LCD screen, etc.

The display device 22 can also or instead include display device portion 22e (FIG. 1E) which includes or take the form of a projector or projectors that can project light, text, images, video or the like onto the adjacent dispensing surface 14a, 14b. The display device 22 can also include various other indicators, lights or the like, which can display alphanumeric text, images, photos, video, animation, etc. In one case the dispensing component 12/display device 22 may also be configured to provide an audio output or other output that can be sensed by a recipient 42 or other user.

As will be described in greater detail below, the dispensing entity or person 40 can load the items 16 onto the dispensing surface 14 of the dispensing component 12, and information associated with the items 16 can be conveyed to the controller 20/sub-controller 20a. Such information can be conveyed by automatic (electronic) transmission (e.g. from another computer or controller) or manually input into the controller 20/sub-controller 20a, such as via an input device or user interface 30. The input device 30 can include or take the form of an open-access input device 30a, which is accessible from the front and/or back side of the dispensing component 12 for use by the dispensing entity 40 and/or recipient 42. The input device 30 can include or take the form of a restricted-access input device 30b which is located on the back side of the dispensing component 12 and designed for use only by the dispensing entity 40.

When a dispensing entity places an item 16 on the system 10, in one case the dispensing entity can also input a code for the item 16 into the input device 30 which enables the controller 20 to retrieve the information associated with the item 16 or order (e.g. a collection of linked items 16, item 16 to be picked up by a single recipient 42, etc.). The inputted, retrieved or conveyed information can include, for example, the name or identity of the recipient of the item 16/order, the name or identity of the company/entity associated with the recipient 42 (if there is one), the contents and/or qualities of the items 16/order, an order identification number, a description of the items 16 being dispensed, cost of the items 16 (for items that are being sold), etc. The display device 22 can be configured to display all or some of the information relating to item 16 positioned on the dispensing surface 14. The information associated with an item 16 may be displayed once the item 16 is positioned on the surface 14, or in some cases before the item 16 is placed on the surface 14 so that in one case for example the recipient 42 knows which position to monitor for their order.

The sensor system 18 may be configured to automatically identify items 16 placed on the surface 14 by sensing certain parameters of the item 16, such as dimensions, weight, footprint, shape, conductivity, etc. and comparing the measured parameters to a database that maps or correlates the measured parameters to parameters/physical qualities of items 16 stored in the database to thereby identify the item 16. The items 16 can also be identified by the sensor system 18 taking readings and utilizing an artificial intelligence system or the like. As noted above, the items 16 can also be identified by manual or automatic input at the time they are placed on the system 10, and the sensor system 18 can augment or confirm such input. Alternatively the sensor system 18 may independently identify the items 16 on the surface 14 without any such external data provided via the input device 30 or otherwise. In any case, once the items 16 are identified, the controller 20/system 10 may then automatically know or retrieve certain various parameters of the item 16, such as size, weight, temperature, shelf life, or the like.

As suggested in FIG. 2B, the surfaces 14a, 14b may be heated or cooled in order to maintain a desired temperature and preserve the shelf life of items 16. In an exemplary dispenser or dispensing system, all or part of one or more dispensing surfaces, e.g., surface 14a, may be heated above ambient temperature so as to maintain an elevated temperature for the dispensing of items such as hot food or drinks. In the same or other exemplary dispenser or dispensing systems, all or part of one or more dispensing surfaces, e.g., surface 14b, may be cooled below ambient temperature so as to maintain a depressed temperature for the dispensing of items such as cold or frozen food or drinks. In the illustrated dispensing system 10, at least one dispensing surface 14b may be cooled by at least thermoelectric heat pump or so-called "Peltier element" 44. The thermoelectric heat pump(s) 44 may reject heat to either the ambient environment or to a heat transfer device such as a circulating fluid line 45. Each shelf 14 can include its own associated heat pump 44 in one case, or more than one shelf 14 can share a heat pump 44. In some systems, the heated fluid of the circulating fluid line 45, flowing away from the shelf 14, may be passed through an air-source heat exchanger 46 in order to reduce the temperature of the heated fluid to a predetermined temperature. The air-source heat exchanger 46 may be interactively coupled to or operated by the controller 20 or be configured to actively cool the heated fluid in line 45 if the fluid is above a pre-selected temperature. It will be appreciated that in other, similar systems the heated fluid may alternately be passed directly to another dispensing surface 14.

In the illustrated dispensing system, all or part at least one other dispensing surface, e.g., surface 14a, may be heated above ambient temperature through subsequent contact with the heated fluid of fluid line 45, i.e., may use the rejected heat from the thermoelectric heat pump(s) 44 and the "cold" dispensing surface, 14b, to heat a "hot" dispensing surface, 14a. The expended fluid from the "hot" dispensing surface 14a may either be collected in an expended fluid line 47 or circulate back to the thermoelectric heat pump(s) 44, such as in a heat-pipe-based heat transfer device. If the circulating fluid is an expendable liquid such as water, the circulating fluid line 45 and expended fluid line 47 may comprise a (locally) open loop cooling system fed from a water loop. If the circulating fluid is a conserved liquid such as a glycol solution, the circulating fluid line 45 and expended fluid line 47 may comprise a closed loop cooling system.

In the illustrated system a reservoir 48 supplies fluid to a pump 49 that feeds the circulating fluid line 45, and the expended fluid line 47 returns fluid to the reservoir 48. In other variations, the reservoir 48 may be paired or substituted with another air-source heat exchanger (not shown) to actively cool the fluid prior to uptake by the circulating fluid line 45. It will be appreciated that in variations of the actively heated or cooled system, at least one shelf 14 may be cooled below ambient temperature by alternate mechanisms such as a chilled fluid line fed by a remote chiller, and/or that at least one shelf 14 may be heated above ambient temperature by alternate mechanisms such as a heated fluid line or an electrically resistive heater.

In some cases the display device 22 is configured to display indicia or information 23 relating to the item 16 at a location physically associated with the item 16. For example, the dispensing component 12 can be configured to store items 16 for pickup by multiple recipients (John Doe, Jane Doe, and R. Smith in the embodiment of FIG. 1A). In the illustrated case, the items 16 are spaced laterally across a width of the surfaces 14a, 14b, and the front display portions 22a, 22b display information 23, in the form of the identity of the recipients 42 in the illustrated embodiment, at a lateral location that corresponds to the lateral location of the corresponding item(s) 16.

The displayed information 23 can be physically associated with the items 16 in any of a variety of manners. For example, as outlined above and shown in FIG. 1A, the displayed information 23 can be displayed on or adjacent to a front edge of the dispensing surface 14, at a location that corresponds to the lateral position of the item(s) 16. For example, in one case at least part of information 23 on the display portion 22 is at the same lateral location (left-to-right in the illustrated embodiment), or at least partially overlaps in the lateral direction, with the lateral location of the associated item(s) 16. Alternatively, where the items 16 are vertically spaced, the display portions 22 may also extend vertically, and the displayed information 23 can be located at a vertically corresponding location. Further alternatively, the displayed information 23 can be projected onto the dispensing surface 14 at a location adjacent to, or directly on/over, the item(s) 16, as shown in FIG. 1E.

As noted above, the dispensing component 12 can include back display portions 22c, 22d (FIG. 1C). During dispensing operations, the dispensing person or entity 40 may load items 16 onto the dispensing surface 14 from a back side of the dispensing component 12, and the recipient 42 may access and retrieve items from a front side of the dispensing component 12. The back display portions 22c, 22d can provide information to the dispensing entity 40 so that the dispensing entity 40 can properly provide and track the items 16. The information 23 displayed to the dispensing entity 40 can be the same or different from the information displayed to the recipient 42 as outlined above. For example, in the embodiment of FIG. 1C, the information on the back display portions 22c, 22d, provides information relating to the identity of the recipient, the expected pick-up time, the amount of time of an overdue pickup, amounts of payment due by the recipient 42, etc.

As shown in FIG. 3, multiple dispensing components 12 can be used together and linked/controlled via the controller 20. Each component 12 can include a sub-controller 20a that is physically coupled to or associated with a single dispensing component 12 and operatively coupled to the associated sensor 18, display device 22, and also operatively coupled the controller 20 and/or other sub-controllers 20a. The sub-controllers 20a/controller 20 can, in turn, be operatively coupled to an order tracking system 26 and an order creation system 28 (which can be also be operatively coupled together) which can be part of or reside on a controller 20 and/or the controller 20 or sub-controllers 20a. The controller 20 can also be operatively coupled to the input devices 30.

The input device 30 can take any of a variety of forms of devices that provide a user interface and/or communication with the controller 20/dispenser 12. In one case the input device 30 may be physically coupled to the dispensing component 12, and can take the form of a keypad (see FIG. 1), touch pad, voice recognition module, mouse or other cursor control device. However the input device 30 can also or instead be physically uncoupled from the dispenser 12, and can in one case include or take the form of a mobile device 24 (such as a cellular phone, tablet, computer, or specialized programmed mobile device, etc.) wireless sensor, scanner, augmented reality glasses, etc. In cases where the input device 30 takes the form of a mobile device or other certain components, the input device may be able to be possessed/controlled by individuals and not be physically coupled to the dispenser 12. The input device 30 can have a memory to store data, such as in one case a delivery code and/or pickup code as will be described in greater detail below. Moreover, while the dispenser 12 is illustrated as include two input devices 30a, 30b, the dispenser 12 may only include a single input device, such as input device 30a, which both dispensing entities 40 and recipients 42 can use.

Figure 4A:
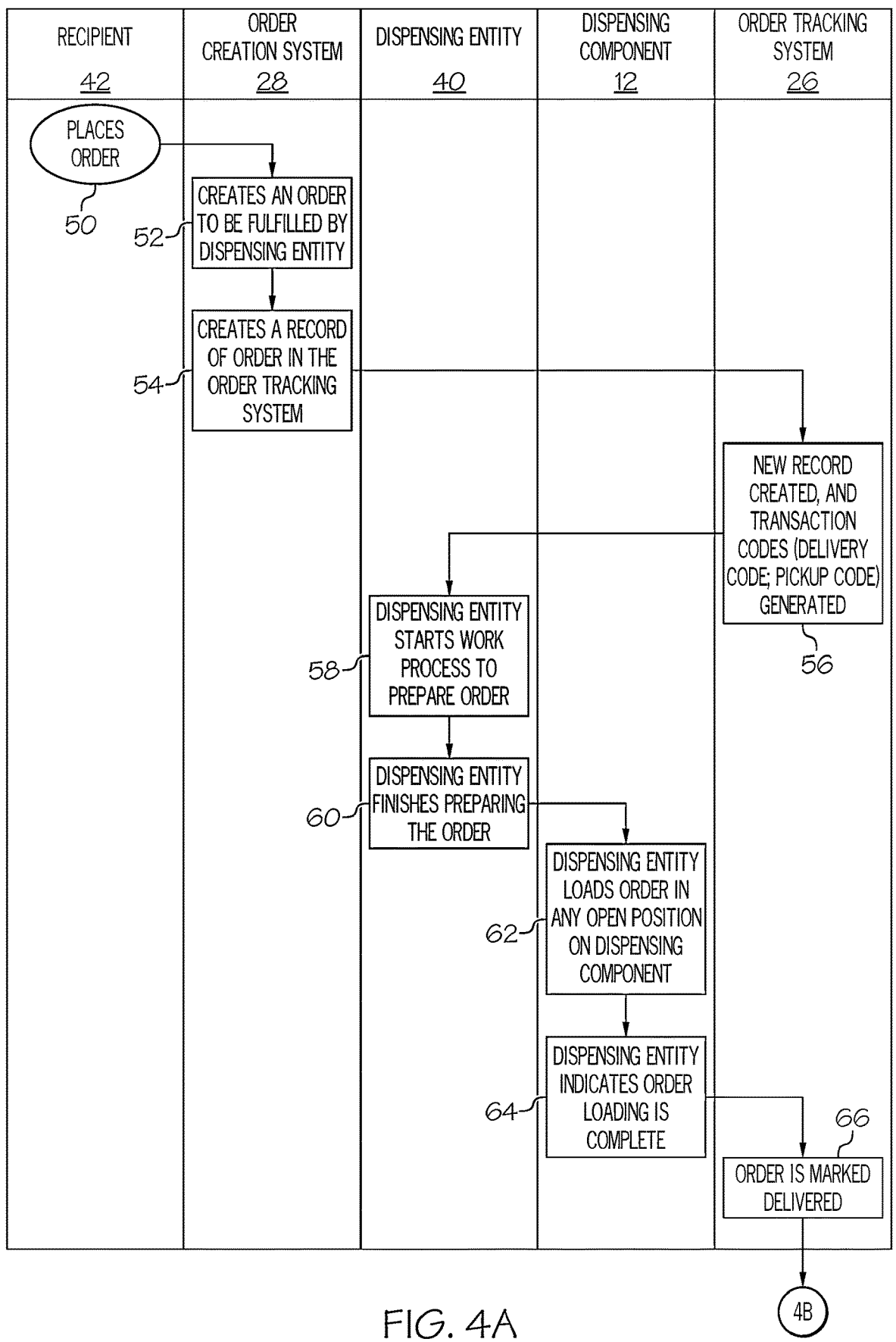
FIG. 4A is the first part of a flow diagram illustrating a process for dispensing an item.
Figure 4B:
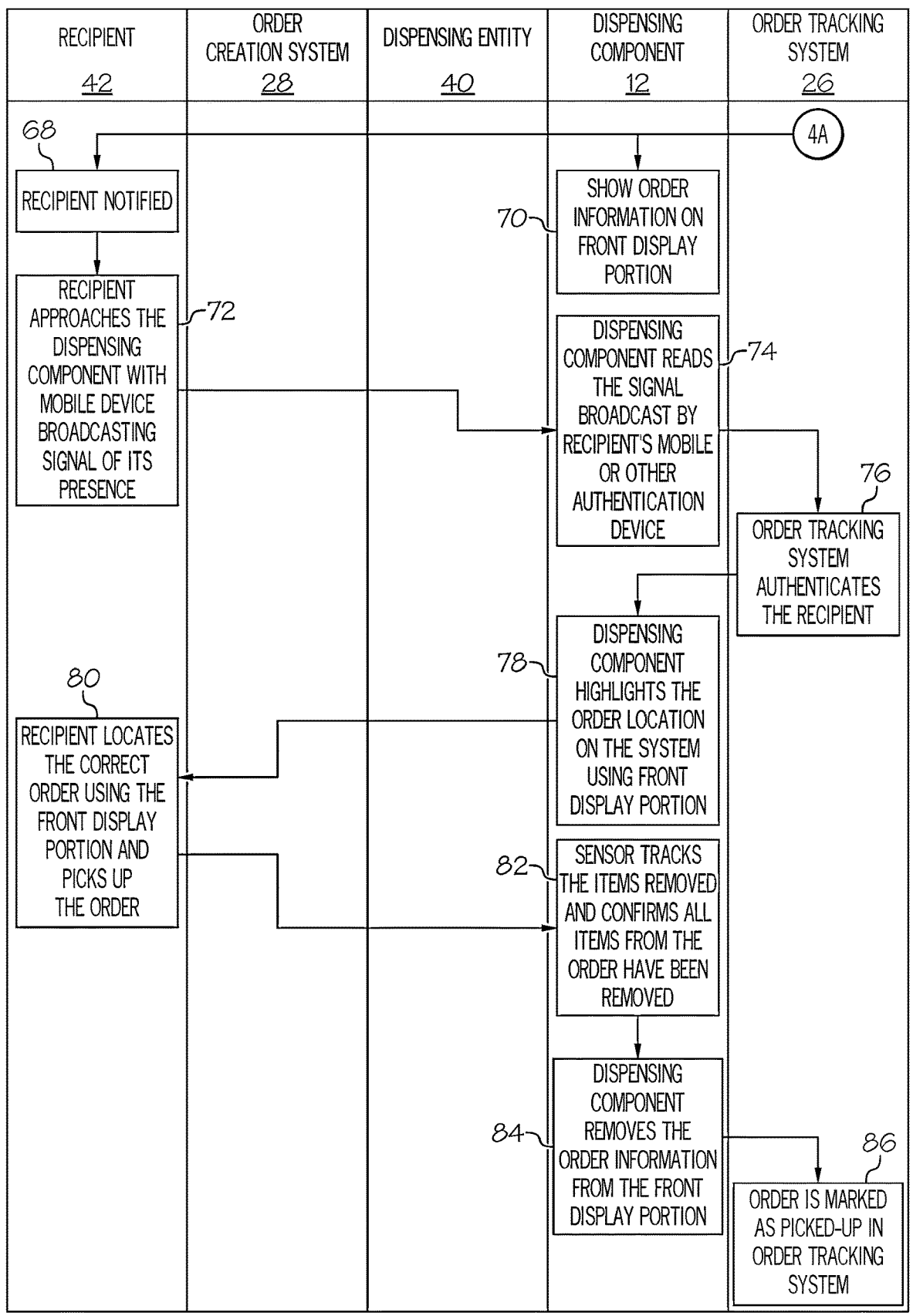
FIG. 4B is the second part of the flow diagram illustrating a process for dispensing an item.

FIG. 4 is a flow diagram illustrating a process for dispensing an item 16 which can be implemented in conjunction with the dispensing component 12 shown in FIGS. 1-3. The method shown in FIG. 4 has five participants (which can be devices, components, parties, entities, individuals or the like, or combinations thereof): dispenser or dispensing entity 40, recipient 42, dispensing component 12, order creation system 28, and order tracking system 26. The process of FIG. 4 starts with recipient 42 placing an order in the order creation system 28, shown as step 50. The recipient 42 can place the order by any of a variety of mechanisms, methods or channels, such as by interacting, via mobile device 24, with an app of the dispensing entity 40 or a related (partnering) entity, by visiting an online website and communicating the order via the internet or world wide web, via phone, in-person ordering (such as at a counter) or other methods.

When placing the order, the recipient 42 can enter or provide information such as the identity of the person/entity placing the order (e.g. identity of the recipient 42/customer), the identity of the person/entity paying for the order (if payment is required) (which in some cases may also be the identity of the customer), method of payment, the identity of the person/entity picking up the order (which in some cases may also be same person as the customer), the identity and quantity of the items 16 desired to be acquired, characteristics/modifications/customization of the items 16 (e.g. specifics of a food or beverage order in one case), method of desired packaging/assembly, date and time of desired pick-up, and other relevant information. This information is received by/conveyed to the order creation system 28 which creates, at step 52, an order to be fulfilled by the dispensing entity 40. The system 10/order creation system 28 then creates a record of the order in the order tracking system 26, as shown at steps 54 and 56.

After the record of the order is created in the order tracking system 26, at step 56 the order tracking system 26 creates transaction codes, such as for example a delivery code that is transmitted to the dispensing entity 40, and/or a pickup code that is transmitted to the recipient 42. The codes can take any of a wide variety of forms, such as alphanumeric codes, scannable codes or symbols (such as bar codes), transmittable signals, etc. Next, as shown at step 58, the dispensing entity 40 undertakes work to prepare/fulfill the open order. For example, an employee or agent, automated device (e.g. robot) of the dispensing entity 40 and/or others may receive a record of the order and the employee, agent, automated device, etc. then undertakes steps to physically acquire and/or assemble the items 16 in accordance with the order. At step 60, when the dispensing entity 40 has completed preparing the order, the order is then physically loaded into the dispensing component 12, as shown at step 62. The process of loading the order into the dispensing component 12 can in one case simply involve placing the items 16 associated with the order onto any unoccupied region of the dispensing surface 14 of the dispensing component 12 as shown in FIGS. 1-3.

Once all of the items 16 associated with the order are placed on the dispensing component 12, the loading person or automated device of the dispensing entity 40 may notify the system 10/controller 20 by, for example in one case, interacting with the dispensing entity input device 30b, as shown in step 64. For example in one case the dispensing entity/loading person 40 may input or scan the delivery code associated with the order into the dispensing entity input device 30b, and press a button of the input device 30b labeled "Order Fulfilled/Loaded" or the like. Once this is done the sensor 18 may scan the dispensing surface 14 to confirm that the sensed items 16 comply with the items 16 for that order. Alternatively, rather than have a loading person or automated device signal the controller 20 once the order is fulfilled, the system 10 may automatically recognize when the order is fulfilled by, for example, the output of the sensor 18. In any case, once it is determined that the order is fulfilled, the system 10 marks the order as "delivered" as shown at step 66.

At step 68, after the order has been loaded into the dispensing component 12, the system 10 sends a notification to the recipient 42 the order is ready for pickup. The pickup code may also be transmitted to the recipient 42 at this time (see FIG. 1A), or re-transmitted if the pickup code was previously transmitted to the recipient 42. The notification to the recipient 42 at this step can be sent by various means such as text/sms message to the recipient's mobile device 24, email, messaging via an app (including the app of the dispensing entity 40 and/or business partners, social media apps etc.) phone call, activating a RFID device, wireless signals (including BLUETOOTH® signals as described in greater detail below) etc. Besides notifying the recipient 42 that the order is ready, the notification may also include information relating to the position of the items 16 in/on the dispensing component 12 (e.g. "upper shelf, right side") and/or the identity and/or location of the associated dispensing component 12 (e.g. "Dispenser #1", "Southwest Dispenser," "Unit 2A") when the pickup location has multiple dispensing components 12. As shown at step 70 and described above, the system 10 can also display information relating to the order on the front display portions 22a, 22b, such as the name of the recipient 42, or other specifics relating to the order.

The recipient 42 may carry on his or her person a mobile device 24 that can wirelessly communicate over short ranges in some cases, without requiring any action by the recipient 42, including by wireless technology including short wavelength UHF radio waves, such as BLUETOOTH® or BLUETOOTH® low energy network technology, or by other personal area network or local area network connectivity technology, or by a RFID tag or the like. The range of the signal transmitted/received by the recipient's mobile device 24 can vary as desired and depending upon particular circumstances, but in one case is a distance of greater than about 5 feet, and in another case greater than about 20 feet, and in one case less than about 200 feet. When the recipient 42 approaches the dispensing component 12 the recipient's mobile device 24 can thereby broadcast a signal of its presence, shown as step 72. The recipient's mobile device 24 may also automatically (and/or if prompted or allowed by the recipient 42) broadcast the details of the pickup order, such as the recipient's identity, the pickup code, etc. The dispensing component 12, controller 20 or order tracking system 26 may include or be coupled to a wireless communication device that can receive the signal from the recipient's mobile device 24 as shown at step 74. However, the recipient 42 can provide the pickup code or other authentication by any of a wide variety of other methods or means.

In another case, the recipient 42 can also be identified and/or authenticated by a key fob or other wireless device that is carried by the recipient 42, which transmits in the radio frequency or at other frequencies. The dispensing component 12, controller 20 or order tracking system 26 can incorporate a reader that can recognize the signal transmitted by the key fob to identify/authenticate the recipient 42. In this case, a recipient 42 may be automatically identified as he or she approaches the physical location of a dispensing component 12. Alternately, the recipient 42 can be authenticated (if authentication is required) through remote messaging to the controller 20 from an independent device or network, such as a cell phone, mobile phone or device carried by the recipient 42, via a text message, a sms message or the like.

The recipient 42 can also be identified and/or authenticated (if desired) by any of a wide variety of other means or mechanisms, including entering information via the recipient input device 30 (FIGS. 1A and 3) by the use of a mechanical or electronic key, by swiping a card with a magnetic stripe, through the use of biometrics (including facial recognition, fingerprint recognition, etc.), or combinations thereof. As noted above, in some cases the recipient 42 may need to be identified and/or authenticated before the recipient 42 is allowed physical access to the dispensing surface 14 (e.g. an unidentified and/or unauthorized user may be blocked from accessing the dispensing surface 14 by a locked locker door, room door, slidable shelf, etc., until after the recipient 42 is identified and/or authorized). However as will be described in greater detail below, in some cases the recipient 42 does not need to be identified and/or authenticated.

As shown at step 76, the recipient 42 is authenticated (in the particular illustrated embodiment) by the order tracking system 26, in one case by for example by receiving a pickup code from the recipient 42 (such as via transmission from their mobile device, by receiving a code via the input device 30, etc.), checking the validity of the pickup code, and if there is a match, authenticating the recipient 42. Alternatively the recipient 42 can be authenticated at step 76 by the various other methods outlined above. Once the recipient 42 is authenticated, the position of the items 16 associated with the recipient's order can be identified and/or highlighted (such as by flashing text, audio output, differing or brighter colors, etc.) on the front display portions 22a, 22b, or on the projected display portion 22e, or by other means, indicated at step 78. The recipient 42 then identifies his or her order and picks up and takes possession of the associated items 16, as shown in step 80 and illustrated in FIG. 1D.

After the recipient 42 picks up and takes position of an item 16 associated with the order the sensor system 18 can identify which items 16 are removed, such as by background subtraction or other methods and will be described in greater detail below, as shown at step 82. The system 10 then references the identity of the items 16 that were removed and compares the information to the order details associated with the item 16. Once the system 10/sensor 18 confirms that the order has been entirely properly removed or dispensed, the displayed order information (e.g. displayed on the front display portion 22a, 22b, 22e) is removed (step 84 and FIG. 1D), and the order tracking system 26 marks the order as complete or picked-up (step 86). If desired the front display portion 22a, 22b can identify the items 16 that have been removed, the quantity of items removed, and other qualities (such as for example in flashing text for a limited time (a few seconds in one case) after removal).

If the order includes multiple items 16, and only some of the items 16 are indicated by the sensor 18 (e.g. at step 80) to be picked up, the system 10 may provide a notification to the recipient on the front display portions 22a, 22b, such as "Please pick up your remaining items," or "Don't forget your coffee," or by other indicia such as flashing lights or texting, audio output, etc.

If a non-authenticated recipient 42 attempts to remove an item 16/order or portions of an order and/or if an authenticated recipient 42 attempts to remove an item 16 or items 16 not associated with their order, the system 10 may provide a notification on the front display portions 22a, 22b, such as "Wrong Order," or "Your order is on the other shelf" or by other indicia such as flashing lights or audio output, etc. In addition an output signal including information related to the improper retrieval or attempted retrieval may be provided to the dispensing entity 40 so that the dispensing entity 40 can intervene if desired. An output signal including information related to the improper retrieval or attempted retrieval may also be provided to the recipient 42, such as by the recipient's mobile device 24.

As noted above, in some cases the recipient 42 is not required to be identified and/or authenticated by the system 10, for example in situations where the recipient 42 is independently authenticated elsewhere, or where the dispensing component 12 and recipient 42 are located inside a secure environment (such as inside a secure workplace where the system 10 is used to dispense inventory), where items are being given away for free, or where the dispensing entity 40 has otherwise determined that authentication is not required. In this case the method shown in FIG. 4 can be carried out without the authentication steps (e.g. without steps 72, 74 and 76).

Figure 5:
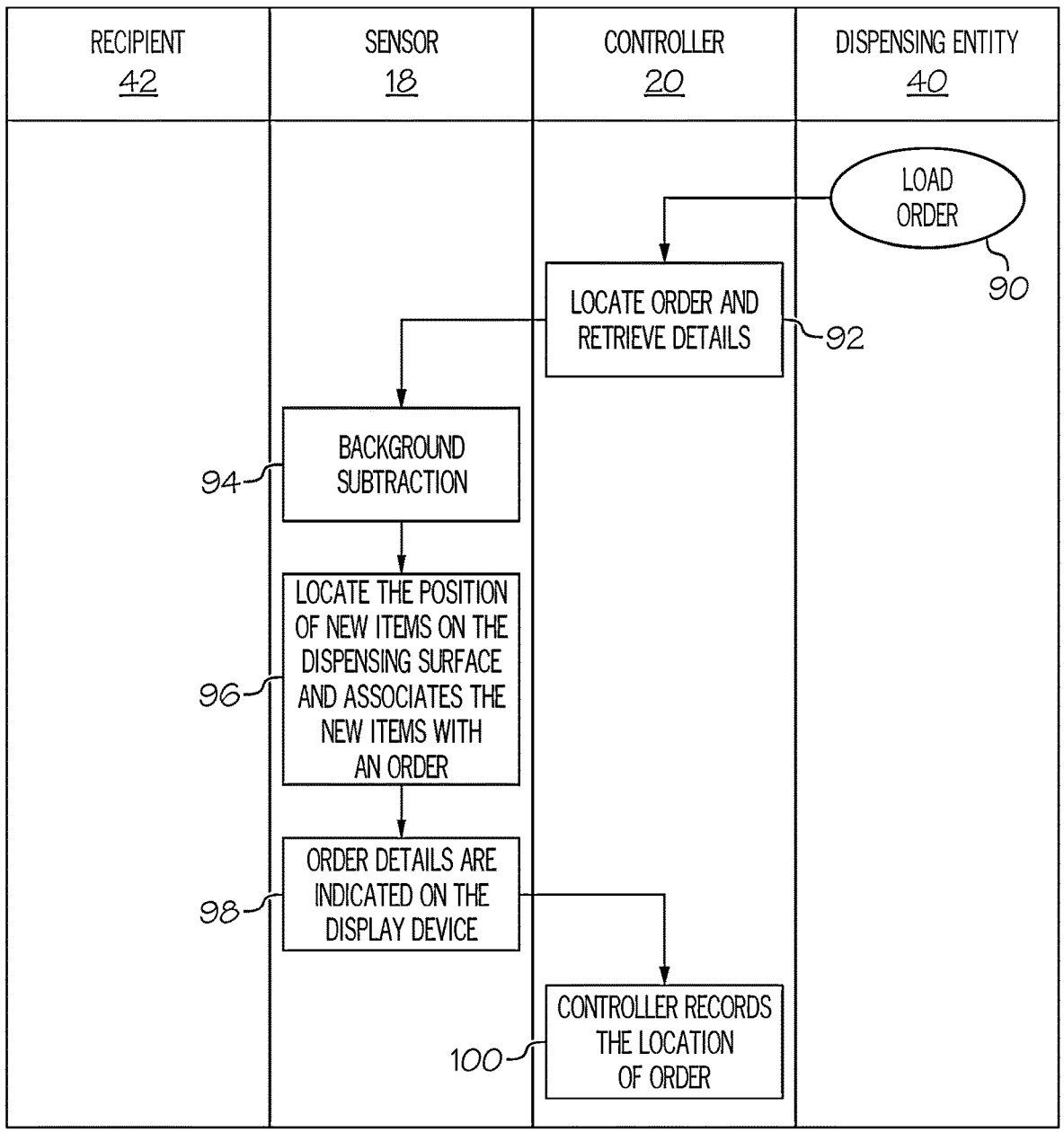
FIG. 5 is a flow diagram illustrating a process for tracking an order.

As noted above, a single order can include multiple items 16, and the current system 10 and method can include systems and methods to track the various items 16 that constitute an order. For example, FIG. 5 is a flow diagram illustrating a process for tracking an order which can be implemented in conjunction with the dispensing component 12 shown in FIGS. 1-3. This flow diagram details the operations after the dispensing entity 40 has loaded an order on the dispensing surface 14 (shown as step 90 of FIG. 5) and/or indicated that order loading is complete (e.g. after, or contemporaneous with, steps 62, 64, 66, 68 or 70 of FIG. 4). At step 92 of FIG. 5, the system 10/controller 20 retrieves the information relating to the order from the order tracking system 26. The sensor system 18 then, at step 94, performs background subtraction or another method of object identification, and identifies the location of new items 16 placed on the dispensing surface 14.

This background subtraction step 94 can include first (e.g. prior to loading the particular items 16/order) conducting foreground detection to establish a baseline image, and comparing images (and/or other data or output from the sensor 18) from a time just before loading began (which the system 10 can tell by the dispensing entity 40 indicating that loading is about to begin via a input device 30, and/or by sensor system 18), to a time after loading is complete (e.g. when the dispensing entity 40 indicates loading is complete, for example at step 64 of FIG. 4). The system 10 and/or sensor system 18, in some cases in combination with the controller 20 and/or associated sub-controllers 20a, 20b, may also perform object recognition to identify the various items 16 associated with the order, and identify and track their location, outer dimensions, shape, reflective qualities, electrical conductivity, and/or other properties to properly identify and determine the location of the item 16. The system 10 and sensor system 18 may alternately perform object identification using surface indicia such as conventional or matrix (so-called "QR code") bar codes that have been applied to or assigned to the various items 16 associated with the order. If multiple dispensing surfaces 14 are available (e.g. the dispensing component 12 has multiple shelves and/or multiple dispensing components 12 are utilized) this step can be performed across all available dispensing surfaces 14.

At step 96 the position of the new items 16 on the dispensing surface 14 are identified, and the new items 16 are associated with the order if appropriate. At step 98 the order details are displayed on the front display portions 22a, 22b, indicating the location of the order on the dispensing surface 14, where the displayed information 23 can be physically associated with the position of the items 16/order as outlined above. At step 100, the position of the items 16 is then recorded in the controller 20.

Since the various items 16 in an order are linked, the system 10 can track the position of all items 16 associated within a single order. For example, the dispensing entity 40 would presumably, if space permits, place all items associated with an order adjacent to each other, on a single surface 14. However, in some cases a single order can span more than one shelves, 14, such as the order for "John Doe" in FIG. 1E which spans two shelves 14. Due to the size of an order and/or if the dispensing surface 14 is already relatively crowded, the items 16 for a single order may be required to be spaced apart on the dispensing surface 14, and/or located on differing surfaces 14, or even a differing dispensing component 12. Moreover, sometimes items 16 can be shifted over time, for example if a recipient 42 (and/or dispenser 40) picks up an item 16 and inspects the item 16 before returning the item 16 to a different location. The system 10 can track all of the various items 16 of an order regardless of where they are moved, using in one case background subtraction.

In some cases certain items 16 of a dispensing component 12 or dispensing surface 14 may be visually similar at first glance, or be identical or nearly identical, which can make tracking items 16 by the sensors 18 difficult, particularly when the various items 16 are removed from the line-of-sight of the sensor 18. In order to address this potential issue the system 10/sensor 18/controller 20 can include machine learning algorithms and other tracking algorithms that can uniquely identify and track each item 16, even when the items 16 are out of view of the sensor 18 using the unique visual and/or geometric signature of each item 16 (e.g. physical anomalies (such as markings, scratches, scuffs on the item)), and/or using identifiers that are added to the items 16, such as markers, handwritten notations, stickers, or tracking unique material variations and shape of each item 16.

For example, FIG. 1E illustrates a scenario where items 16a and 16b are positioned on the upper dispensing surface 14a and associated with an order for "John Doe." The front upper display portion 22a displays indicia 23 "John Doe" that is generally physically aligned with the associated items 16a, 16b. The upper dispensing surface 14a also includes item 16c that is associated with an order for "Jane Doe". The front upper display portion 22a displays indicia 23 "Jane Doe" that is generally physically aligned with that item 16c. Finally, item 16d is positioned on lower upper dispensing surface 14b and associated with the order for "John Doe," and the front lower display portion 22b displays indicia 23 "John Doe" that is generally physically aligned with item 16d.

Figure 1F:
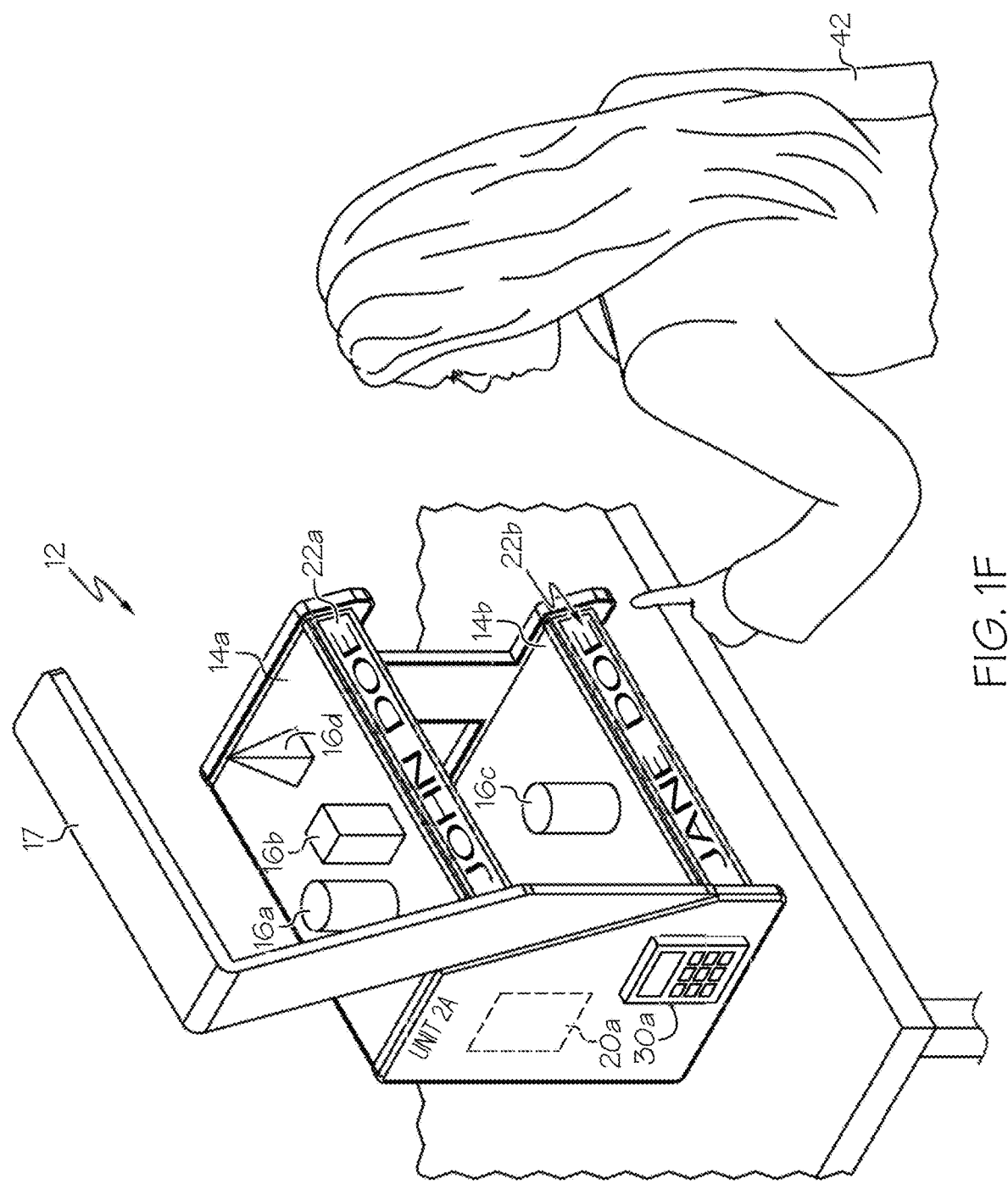
FIG. 1F is a front perspective view of the system of FIG. 1E, with the items rearranged.

In FIG. 1F the positioning of items 16c and 16d has been switched by a user. In this case the sensor 18/system 10 can automatically recognize that the position of the items 16c, 16d has been changed or reversed and will continue to track the status of those items 16c, 16d. In addition the system 10 will recognize that the items 16a, 16b, 16d are part of the same order and/or intended for the same recipient, and are adjacent to each other. In this case the indicia 23 "John Doe" on the upper front display portion 22a can be automatically increased in size or font, or stretched to extend the length of the display portion 22a and/or generally match the outmost lateral dimensions of the items 16 in that order, to automatically adjust to the adjusted "size" (spanning lateral dimension) of the order of items 16. In addition, the indicia 23 displayed on the lower front display portion 22b is automatically adjusted to display "Jane Doe" at the appropriate location. In this manner, the items 16 can be moved and adjusted, and orders can be combined (as shown) or broken apart (opposite to the steps shown in FIGS. 1E and 1F), but the system 10 can automatically adjust, continuing to track the items 16 and adjust the display system 22 and displayed information 23 accordingly.

The system 10/dispensing component 12 can also be used to return items 16. In this case, the roles of the "recipient" and "dispensing entity" may be reversed from that described above, and returning entity (the "dispensing entity" in a return transaction) may place the items 16 onto the dispensing component 12 for example from the front side, and the return-receiving entity (the "recipient" in the return transaction) may remove the items 16 from the dispensing component 12 for example from the back side. In this case the returning entity 42 may have been provided with a return code which corresponds in concept to the order code in the example above. When the returning entity 42 approaches the dispensing component 12 the front display portions 22a, 22b and/or projected display 22e may cue the returning entity 42 where to place the items 16 to be returned on the dispensing component 12. Alternatively, the returning entity 42 may be free to place the returned items 16 at any open location on the dispensing component 12.

Once the item 16 to be returned is placed on the dispensing component 12, the sensor 18 may scan the dispensing surface 14 to sense, identify and/or confirm the status and identity of the returned items 16. The system 10/controller 20 may then send a notice to the return-receiving entity 40 (e.g. to their mobile device 24) and/or may identify the location of the returned item 16 on the back display portions 22a, 22b (and/or projected display 22e). Once the return-receiving entity 40 has removed the returned item 16 from the dispensing component 12 and/or confirmed the return, the return-receiving entity 40 may mark the status of the item 16 as "returned," provide a notice/receipt to the returning entity 42 and/or issue a credit or payment to the returning entity 42 if appropriate.

Figure 6:
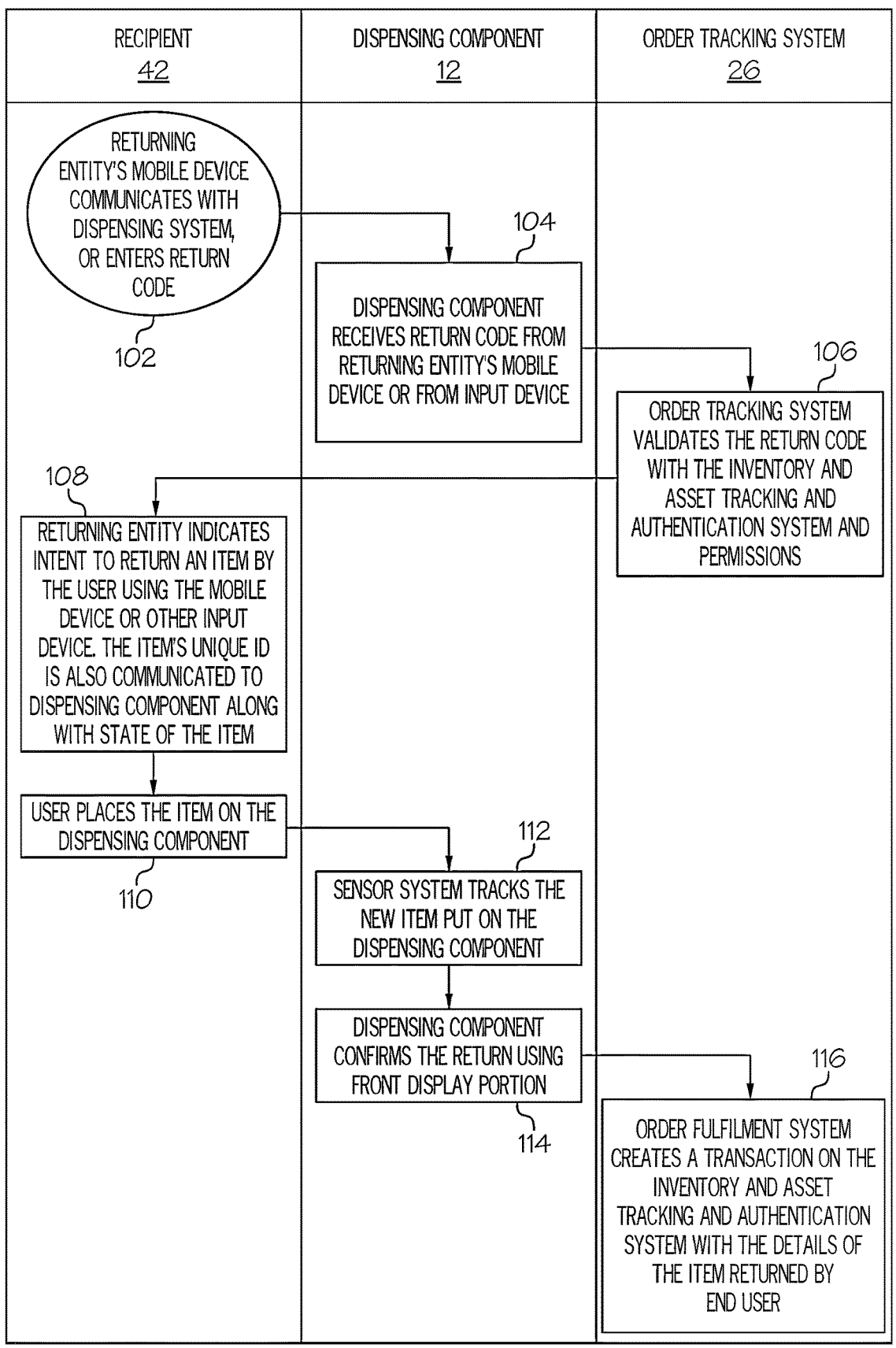
FIG. 6 is a flow diagram illustrating a process for tracking a return.

FIG. 6 is a flow diagram illustrating an example of a process for receiving returns for an item 16 and associated transactions for asset management. The process starts at step 102 with the recipient/returning entity 42 approaching the dispensing system 10/dispensing component 12 and, in the illustrated embodiment, the returning entity's mobile device 24 communicating with the dispensing system 10. Alternatively the returning entity 42 can be identified and/or authenticated in the manners outlined above, and in another case the returning entity 42 is not required to be identified and/or authenticated. If a return code is utilized, at step 104 the dispensing component 12 (and/or the associated sub-controller 20a or controller 20) receives the return code. Alternatively the returning entity 42 can communicate the authentication code via input device 30.

At step 106, the order tracking system 26 receives the return code and validates the return code with an asset tracking and authentication system, and identifies permissions. The returning entity 42 then indicates his/her intent to return an item 16 by the returning entity's mobile device 24 and/or by an input device 30. Each item 16 may have a unique identifier that is also communicated to dispensing component 12 along with state of the item 16 in step 108. The state of the item can relate to nearly any quality of the item 16 such as name, description, size, color, charge status (e.g. for loaned items with rechargeable batteries), identified damage, useful life left, item number, identification of a malfunction or defect, etc., and the information can be communicated by the user's mobile device 24 and/or the input devices 30, such as in one case by prompting the returning entity 42 to answer certain queries. Next at step 110 the returning entity 42 places the item 16 to be returned on an available space on the dispensing surface 14 of the dispensing component 12. At step 112 the sensor 18 identifies the new item 16 placed on the dispensing surface 14. At step 116 the dispensing component 12 provider information confirming the return using front display portion 22a, 22b or other communication to the returning entity 42. Next at step 116 a transaction is created on the order tracking system 26 including the details of the item 16, such as the unique identifier for the item 16, that was returned.

Figure 7:
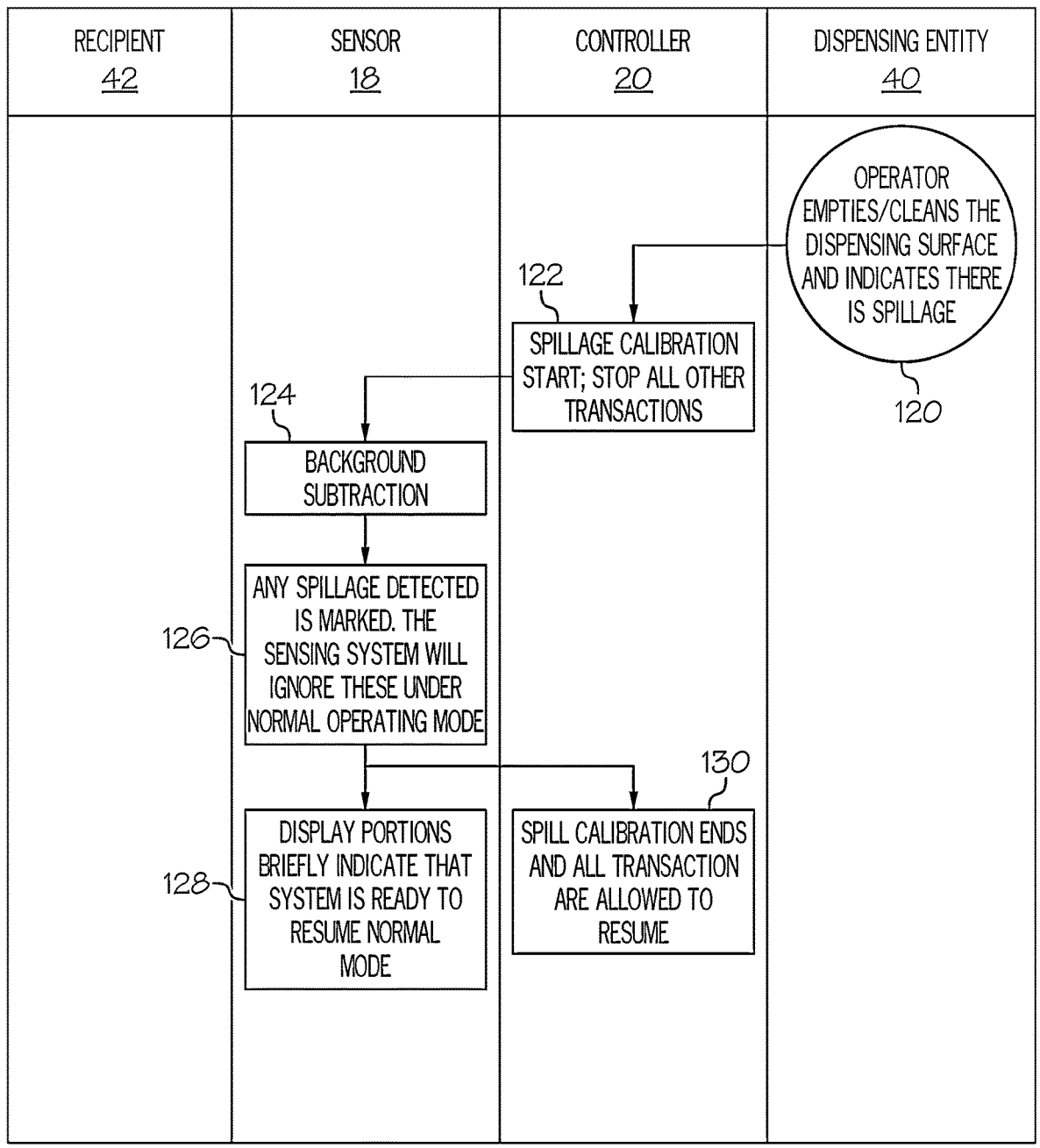
FIG. 7 is a flow diagram illustrating a process for spillage calibration and tracking.

In some cases the dispensing surface 14/dispensing component 12 can have spills, stains, dirt, debris, etc. which are not easily cleaned up and present a persistent image (collectively termed "spillage" herein), which can interfere with proper readings by the sensor 18, if not properly accounted for. FIG. 7 is a flow diagram illustrating a process for calibrating the system 10/sensor 18 to account for spillage, to ensure the sensor system 18 does not mistakenly identify the spills as items 16 to be dispensed.

This process of FIG. 7 begins at step 120 with personnel from the dispensing entity 40 identifying the fact that there is spillage and communicating with the controller 20 that there is spill. The dispensing entity 40 can communicate the fact that there is spillage via the dispensing entity input device 30b (FIGS. 1C and 3) such as by activating a "spillage" button in one case, or by using a mobile device or other user interface.

At step 122, the controller 20 stops all transactions and initializes the spillage calibration process. In some cases, the fact that the calibration process is underway may be communicated to recipients 42 and/or dispensers 40 via the display device 22. The spillage calibration process includes the sensor system 18 conducting a background subtraction process at step 124. In some cases the background subtraction process at step 124 is based on the assumption that all valid items 16 have been removed from the surface 14 (or have already been identified by the sensor system 18 and that their location/identity is known), such that any other "items" 16 identified as foreground items (e.g. non-background items) are identified as spillage, particularly those that have a small thickness, if any is detectable. At step 126 the system 10/sensor 18 identifies the spillage and stores its location.

The display device 22 may then provide an output indicating that the system 10 has finished calibration and is ready to resume normal dispensing activity, as shown in step 128. At step 130, the controller 20 ends the calibration process and resumes normal dispensing operations. These spillage locations can then be ignored (e.g. not identified as items 16 for dispensing) during item detection steps going forward.

In some cases, if the spillage is later cleaned up (e.g. during a heavy-duty cleaning, stain removal process, etc.) the calibration process of FIG. 7 can be repeated and the previously-identified spillage items removed from the memory of the sensor 18/system 10.

Figure 8:
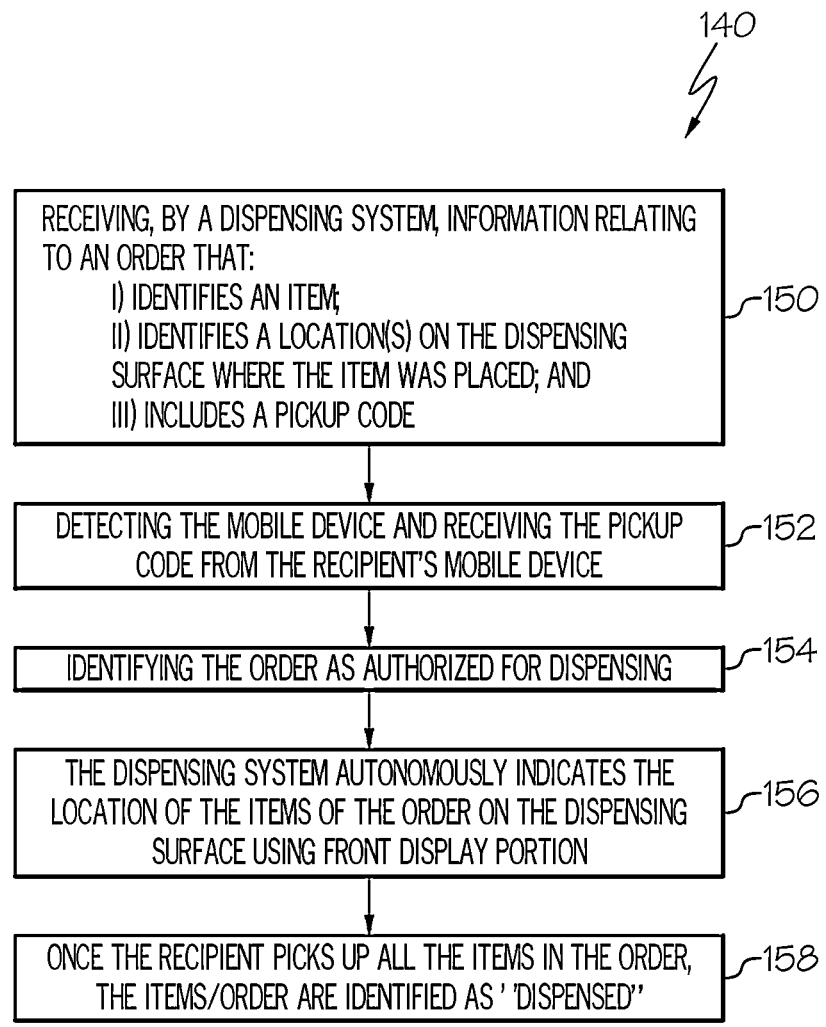
FIG. 8 is a flow chart illustrating a dispensing process.

FIG. 8 illustrates a process 140 for dispensing an order which has been fulfilled and placed on the dispensing component 12, is awaiting pickup, and can use the system 10 and methods shown in FIGS. 1-7 and described above. At step 150, the system 10 receives information relating to a dispensing transaction, wherein a dispensing entity 40 has placed the order on or in the dispensing component 12. The received information can include the identity of the item 16, the location of the item 16 on the dispensing surface 14, and a pickup code, along with other information as identified herein. Next, at step 152, the dispensing system 10 detects the recipient's mobile device 24 and receives the pickup code from the mobile device 24. The mobile device 24 may be detected by and may transmit the pickup code by any means, such as by signals transmitted over a local area network connection, radio-frequency transmissions sent and received via a Bluetooth connection, a radio-frequency identification (RFID) tag, or other means as described above. Of course, as outlined above the recipient 42 can be authorized by differing means than his or her mobile device 24, and in an alternative embodiment may not need to be authenticated at all. In addition the pickup code (if utilized) can be transmitted and confirmed by any of a wide variety of methods besides transmission by a recipient's mobile device 24.

Next, at step 154, if the pickup code is proper, then the status of the order is changed to "authorized" for dispensing, or the like. At step 156, the dispensing system 10/dispensing component 12 autonomously highlights and/or identifies the position of the items 16 for that order using the display device 22. Finally, at step 158, when the sensor system 18 confirms that all items 16 from the order have been picked up from the dispensing surfaces 14 by the recipient 42, the dispensing system 10 changes the state of the order/items to "dispensed." The system 10/controller 20 may send a notice to the recipient 42 and/or dispensing entity 40 and/or generate an invoice or process payment from the recipient 42 (or other authorized party) to the dispensing entity, if appropriate.

Figure 9:
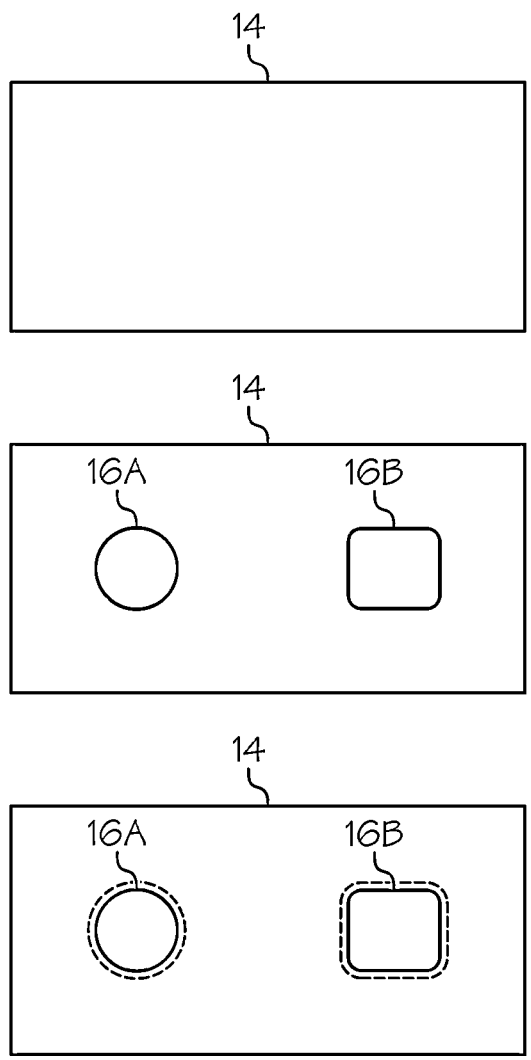
FIG. 9 is a schematic representation of item identification using background subtraction.

FIG. 9 illustrates one particular operation of the system 10/controllers 20/sensor system 18 using object recognition to identify and detect objects. As noted above the sensor system 18 may be configured to automatically identify items 16 placed on the surface 14 by sensing certain parameters of the item 16, such as dimensions, weight, footprint, shape, conductivity, etc. and comparing the measured parameters to a database that maps the measured parameters to a database to thereby identify the item 16. FIG. 9 illustrates a process implemented by a sensor system 18 in the form of a camera or visual identification system looking down (or in some cases, up) toward and perpendicular to a dispensing surface 14. In the first step, the dispensing surface 14 is provided, as shown in the upper drawing of FIG. 9. In the second and third steps, the items 16A, 16B are positioned on the dispensing surface 14, as shown in the middle drawing of FIG. 9. The item location, and the space occupied by items 16A and 16B are then identified, after background subtraction if employed, based on the outer dimensions, shape, reflective qualities, or other properties of items 16A, 16B, as shown in steps 4 and 5, and shown in the bottom drawing of FIG. 9. The object recognition described herein can be carried out by any of a wide variety of methods and systems, including by edge detection techniques, primal sketch methods, the use of generalized cylinders, the use of geons, edge matching, divide-and-conquer searching, greyscale matching, gradient matching, histograms of receptive field responses, large model bases, interpretation trees, hypothesize-and-test, pose consistency, pose clustering, invariance, geometric hashing, scale-invariant feature transform, speeded up robust features, bag of words representations, genetic algorithms, 3D reconstruction, trained convolutional neural networks, and other methods for visual positioning and tracking.

Figure 10:
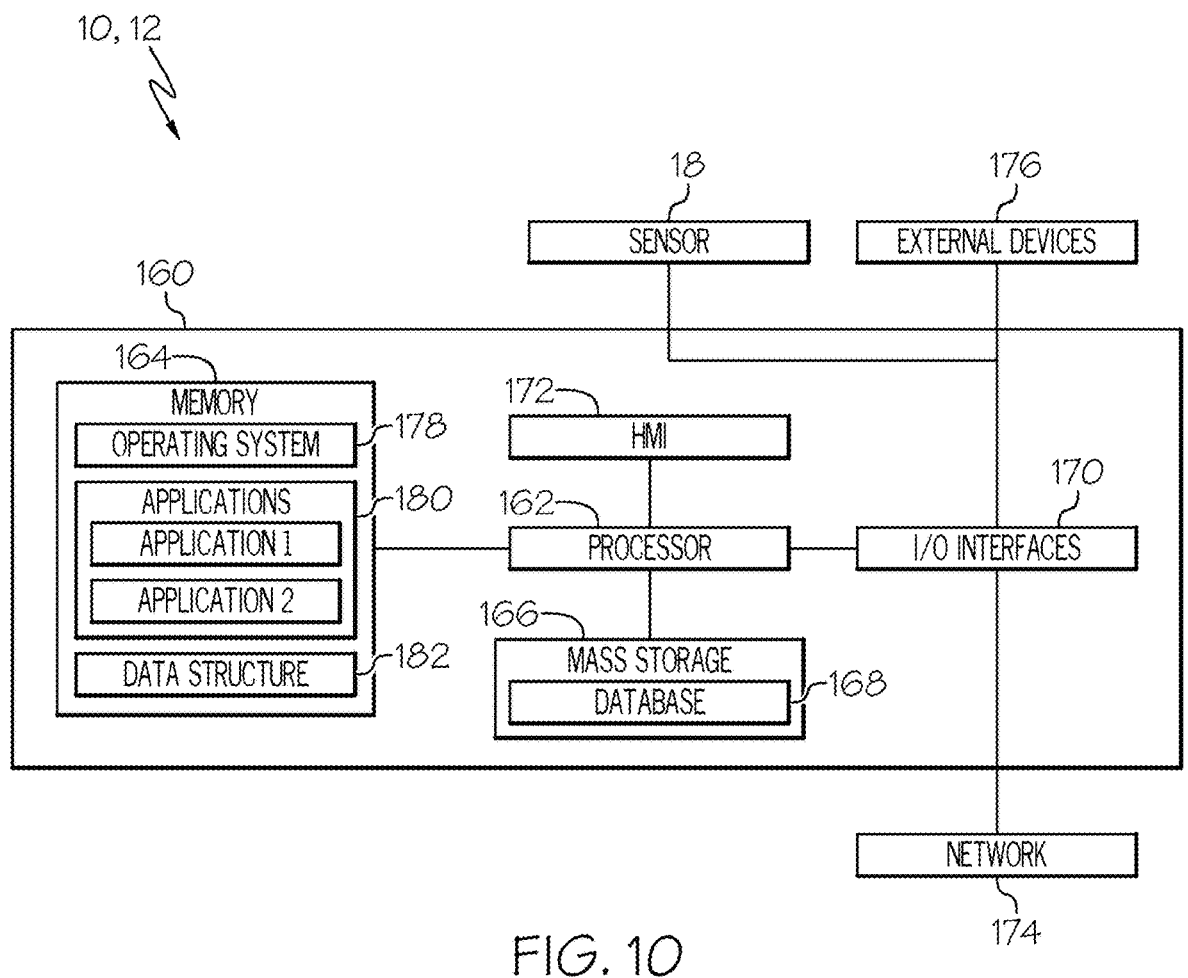
FIG. 10 is schematic representation of a dispensing system.

With reference to FIG. 10, any or all the functions and methods as described herein, or a portion thereof, may be implemented on one or more computer systems, such as the dispensing component 12/system 10 including a computer system 160. The computer system 160 (which can in one case be the same component as the controller 20) includes a processor 162, a memory 164, a mass storage memory device 166 that includes a database 168, one or more input/output (I/O) interfaces 170 and may include a Human Machine Interface (HMI) 172 (either of which can take the form of or include input device 30 and/or mobile device 24). The computer system 160, and thus the dispensing component 12, may include and/or be operatively coupled to a network 174, sensor system 18 and/or other devices 176 (such as other dispensing components 12), via one or more I/O interfaces 170. The processor 162 can include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 164. Memory 164 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 166 can include data storage devices such as a hard drive, optical drive, tape drive, volatile or non-volatile solid state device, or any other device capable of storing information.

The processor 162 can operate under the control of an operating system 178 that resides in memory 164. The operating system 178 manages processing resources so that computer program code embodied as one or more computer software applications, such as applications 180 residing in memory 164, has instructions executed by the processor 162. In an alternative embodiment, the processor 162 executes the applications 180 directly, in which case the operating system 178 may be omitted. One or more data structures 182 may also reside in memory 164, and may be used by the processor 162, operating system 178, or applications 180 to store or manipulate data.

The I/O interface 170 provides a machine interface that operatively couples the processor 162 to other devices and systems, such as the network 174, sensor 18 and other external devices 176. The applications 180, which includes data comprising program code for execution by processor 162 to perform the methods and functions as described above, thereby works by communicating via the I/O interface 170 to provide the various features, functions, applications, processes, or modules comprising embodiments of the system disclosed herein. The applications 180 may have program code that is executed by, for example, other system or network components external to the computer system 160. Indeed, given the nearly endless hardware and software configurations possible, persons having ordinary skill in the art will understand that embodiments of the invention may include applications that are located externally to the computer system 160, distributed among multiple computers or other external resources, or provided by computing resources (hardware and software) that are provided externally to computer system 160.

The HMI 172, if included, is operatively coupled to the processor 162 of computer system 160 in a known manner to allow a recipient to interact directly with the computer system 160. The HMI 172 may include video or alphanumeric displays, a touch screen, a speaker, and any other suitable audio and visual indicators capable of providing data to a user. The HMI 172 may also include input devices and controls such as an alphanumeric keyboard, a pointing device, keypads, pushbuttons, control knobs, microphones, etc., capable of accepting commands or input from the recipient and transmitting the entered input to the processor 162, and other components as outlined above.

A database 168 resides on the mass storage memory device 166, and may be used to collect and organize data used by the various systems and modules described herein. The database 168 may include data and supporting data structures that store and organize the data. In particular, the database 168 may be arranged with any database organization or structure including, but not limited to, a relational database, a hierarchical database, a network database, or combinations thereof. A database management system in the form of a computer software application executing as instructions on the processor 162 may be used to access the information or data stored in records of the database 168 in response to a query, where a query may be dynamically determined and executed by the operating system 178, other applications 180, or one or more modules.

The system 10 and method identified herein can identify and track, as a single order, a collection of various items 16 and thereby create a representation of a virtual and dynamic "compartment" on or in the dispensing component 12 within which the order is positioned. The hardware and software of the system 10 cooperate to identify the virtual compartment. The virtual compartment can span multiple shelves/surfaces 14 and/or dispensing components 12, thereby provides increased flexibility to allow optimal use of available space. Optionally the virtual compartments may be identified by using electronic indicators or even virtual indicators such as light displays, light indicators, augmented reality technology, or projectors projecting images onto the dispensing surface 14 or a wall, other screens, or mobile devices showing a virtual representation of the dispensing component 12/dispensing surface 14. For example, in one case the display portion 22e may project a perimeter or border on the dispensing surface 14, within which each item 16 associated with an order may be positioned.

The resultant dispensing system 10 is a low-friction, dynamic, and adaptive dispensing system that may initially have the outward appearance of a standard shelving unit. However the system 10 and method provides advantages over existing dispensing systems such as lockers that physically divide a space into compartments, where each individual compartment holds items from only a single order. The compartment size of such lockers also limits the maximum size of objects that can stored in the locker. The density of items/order in traditional lockers is also governed by the compartment size and density. Orders with small overall volume compared to the compartment in which the order is stored creates wasted space. In contrast, the present system 10 and method provides for flexible and dynamic definition of virtual "compartments" such that usage of space and ease of access are optimized.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A dispensing system comprising:
a dispensing component;
a sensor configured to identify a location of each of a plurality of items on or in the dispensing component, wherein the plurality of items are part of a single order;
a controller operatively coupled to the sensor, wherein the controller is configured to automatically track, after initial placement of the plurality of items on or in the component, the location of each of the plurality of items that are repositioned on or in the component, and wherein the controller is configured to associate each of the plurality of items with the order, both before and after repositioning; and
a display device operatively coupled to the controller, wherein the display device is configured to dynamically display information that conveys that the plurality of items are part of the single order.

2. The system of claim 1 wherein the display device is configured to display the information at a location physically associated with each of the plurality of items.

3. The system of claim 1 wherein the sensor is configured to automatically identify the location of the plurality of items on or in the dispensing component without any manual input, wherein the controller is configured to automatically identify the plurality of items based upon an output from the sensor without any manual input, and wherein the controller is further configured to, based upon the identification of the plurality of items based upon the output from the sensor, automatically associate the plurality of items with the associated order without any manual input.

4. The system of claim 1 wherein the component includes a generally flat dispensing surface, wherein the plurality of items are configured to be located on the dispensing surface, wherein the sensor is positioned above the dispensing surface, and wherein the display device is configured to display the information along or adjacent to at least one of a front edge or rear edge of the dispensing surface.

5. The system of claim 4 wherein the display device extends generally laterally, wherein the order spans a lateral location on the dispensing surface, and wherein the displayed information at least partially laterally overlaps with the location of the order.

6. The system of claim 1 wherein the controller is configured to automatically vary at least one of a positioning or an extent of the displayed information to adjust the displayed information to match the outermost lateral dimensions of the order.

7. The system of claim 6 wherein the controller is configured to receive information that the plurality of items are part of the order, wherein the varying at least one of the positioning or extent of the displayed information includes expanding a size or extent of the displayed information to account for an added item that is part of the order, or reducing the size or extent of the displayed information to account for a removed item that is part of the order.

8. The system of claim 1 wherein the display device is configured to vary the location of the displayed information for the order based upon at least one of a space occupied by items associated with the order, or a presence or absence of any adjacent items.

9. The system of claim 1 wherein the display device is configured to project the displayed information on a dispensing surface of the component.

10. The system of claim 1 wherein the displayed information includes an identity of a recipient of the order.

11. The system of claim 1 wherein said sensor includes at least one optical sensor.

12. The system of claim 1 wherein the sensor includes an optical recognition device and wherein the controller is configured to track a position of the item on or in the dispensing component by object recognition and background subtraction.

13. The system of claim 1 wherein the controller is configured to identify the plurality of items by comparing an output of the sensor, which output relates to measured physical attributes of the item, to a database that correlates measured physical attributes with the identity of the items.

14. The system of claim 1 wherein the displayed information relating to the plurality of items is displayed on two different shelves of the component.

15. The system of claim 1 wherein the system is configured to transmit position information to a mobile device of a recipient of an order, wherein the transmitted position information is human readable and conveys information relating to the position of an item of the order on or in the component.

16. The system of claim 1 wherein the system is configured to transmit a pickup code to a recipient, wherein the pickup code is subsequently transmittable by the recipient to the system as proof of authorization of the recipient.

17. The system of claim 1 wherein the controller is configured to, in response to receiving a code from a recipient, cause the display device to call attention to the items associated with the order.

18. The system of claim 1 wherein the controller is configured to track each item as a separate and unique item separate from any other item, and wherein the controller is configured to associate each unique item with the order.

19. The system of claim 1 wherein the display device is a dynamic display screen.

20. The system of claim 1 wherein the plurality of items of the order includes different types of items.

21. The system of claim 1 wherein the controller is configured to cause the display device to remove the displayed information after at least one of the sensor or the controller determines that all items associated with the order have been removed from the component.

22. A method for dispensing items comprising:
identifying, via a sensor, a position of a plurality of items on or in a component;
associating each of the plurality of items with a single order;
displaying, via a display device, information relating to said order, wherein the displayed information includes an identity of a recipient of the order;
automatically tracking, after initial placement of the plurality of items on or in the component, a location of one or more of the plurality of items that are repositioned on or in the component and that are part of the order, wherein each of the plurality of items are associated with the order, both before and after repositioning; and
after the tracking step, adjusting at least one of the positioning or extent of the displayed information based upon movement of at least one of the plurality of items that are part of the order.

23. The method of claim 22 wherein the identifying, associating, displaying, tracking and adjusting steps are done automatically and without any manual input.

24. A dispensing system comprising:
a dispensing component;
a sensor configured to automatically sense, without any manual input, an item on or in the dispensing component;
a controller operatively coupled to the sensor and configured to identify, without any manual input, the item based upon an output from the sensor, wherein the controller is further configured to, based upon the identification of the item based upon the output from the sensor and without any manual input, associate the identified item with a recipient, and
a display device operatively coupled to the controller, wherein the display device is configured to dynamically display information relating to said item, wherein the display device is configured to display the information on a portion of the dispensing component at a location physically associated with the item, wherein the sensor is configured to automatically, and without any manual input, scan a plurality of items positioned on the dispensing component and provide an output to the controller, and wherein the controller is configured to, based upon the output provided by the sensor, compare an identity of the plurality of items to a set of items associated with a single order, such that when a user not associated with the single order removes an item associated with the single order, the controller provides an output to provide notification to the user.

25. The system of claim 24 wherein the controller is configured to, based upon the output provided by the sensor, compare the identity of the plurality of items to the identity of the set of items associated with the single order, such that the controller can in turn determine and provide an output when the order is determined to be fulfilled such that all items associated with the order are determined to be present on the dispensing component.

26. The system of claim 24 wherein the sensor is configured to, based upon the output provided by the sensor, compare the identity of the plurality of items to the identity of the set of items associated with a single order, such that when an item associated with the single order is removed and other items associated with the order remain on the dispensing component, the controller provides an output to cause the display device to notify the recipient.

27. A dispensing system comprising:
a dispensing component;
a sensor configured to automatically sense, without any manual input, an item on or in the dispensing component;
a controller operatively coupled to the sensor and configured to identify, without any manual input, the item based upon an output from the sensor, wherein the controller is further configured to, based upon the identification of the item based upon the output from the sensor and without any manual input, associate the identified item with a recipient, and
a display device operatively coupled to the controller, wherein the display device is configured to dynamically display information relating to said item, wherein the display device is configured to display the information on a portion of the dispensing component at a location physically associated with the item, wherein the display device includes a front display portion positioned on a front of the dispensing component and configured to display information to the recipient, wherein the display device further includes a back display portion positioned on a back of the dispensing component and configured to display information to a dispensing person or entity, and not to the recipient, and wherein the controller is configured to cause the back display portion to display information relating to the item that is different than information relating to the item displayed by the front display portion.

28. A dispensing system comprising:

a dispensing component;

a sensor configured to automatically sense, without any manual input, an item on or in the dispensing component;

a controller operatively coupled to the sensor and configured to identify, without any manual input, the item based upon an output from the sensor, wherein the controller is further configured to, based upon the identification of the item based upon the output from the sensor and without any manual input, associate the identified item with a recipient, and a display device operatively coupled to the controller, wherein the display device is configured to dynamically display information relating to said item, wherein the display device is configured to display the information on a portion of the dispensing component at a location physically associated with the item, wherein the item is a unique item having at least one of a unique visual signature or geometric signature, and wherein the system is configured to identify and track a plurality of unique items positioned on the dispensing component based on the at least one of a unique visual signature or geometric signature such that the system is able to track the plurality of items even when items are temporarily out of view of the sensor.

29. The system of claim 28 wherein the at least one of the unique visual signature or the geometric signature includes handwritten notations.

* * * * *